US 6,665,662 B1

(12) United States Patent
Kirkwood et al.

(10) Patent No.: US 6,665,662 B1
(45) Date of Patent: Dec. 16, 2003

(54) QUERY TRANSLATION SYSTEM FOR RETRIEVING BUSINESS VOCABULARY TERMS

(75) Inventors: Michael Kirkwood, San Francisco, CA (US); Sima Yazdani, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 313 days.

(21) Appl. No.: 09/823,662

(22) Filed: Mar. 30, 2001

Related U.S. Application Data

(60) Provisional application No. 60/252,378, filed on Nov. 20, 2000.

(51) Int. Cl.$^7$ ................................. G06F 17/30
(52) U.S. Cl. ........................................ 707/3
(58) Field of Search ................. 707/4, 100, 3, 707/5, 10, 101, 102, 104.1, 103 R, 203; 704/275; 709/217, 236; 715/513

(56) References Cited

U.S. PATENT DOCUMENTS 6,438,540 B2 * 8/2002 Nasr et al. ............... 707/3
6,480,860 B1 * 11/2002 Monday ................ 707/102
6,510,434 B1 * 1/2003 Anderson et al. ........ 707/100

OTHER PUBLICATIONS

Jon Anthony, "Ariadne White Paper: I–Synthesizer, Core Technology Review", Mar. 30, 2001, Version 1.1, Synquiry Technologies, Ltd, pp. 1–36.

Susan Mael, "Synquiry Brings Context and Merchandising to E–Commerce Sites", The Online Reporter, Apr. 23–27, 2001, Issue No. 244, pp. 1–3.

* cited by examiner

Primary Examiner—Diane D. Mizrahi
Assistant Examiner—Apu M. Mofiz
(74) Attorney, Agent, or Firm—Hickman Palermo Truong & Becker LLP

(57) ABSTRACT

Techniques for translating queries for related concepts in a database of concepts and relationships among concepts include translating the query for related concepts into a markup language in a first document at a concept client. The database is local to a concept server. A query originates from a concept client. The first document is sent to a concept server over a network, and a second document in the markup language is received over the network from the concept server. The second document includes results based on responses from the concept server. The markup language in the second document is translated into values of the related concepts at the concept client. With these techniques, retrievals of related concepts, which involve complex transactions between a calling routine and the database, can be performed largely at the concept server, sparing the network much message traffic. Furthermore, by providing for a client-side adapter library, the developer of the concept client is spared the details of translating between the markup language used in the first and second documents and the queries and resulting values used by the client.

19 Claims, 10 Drawing Sheets

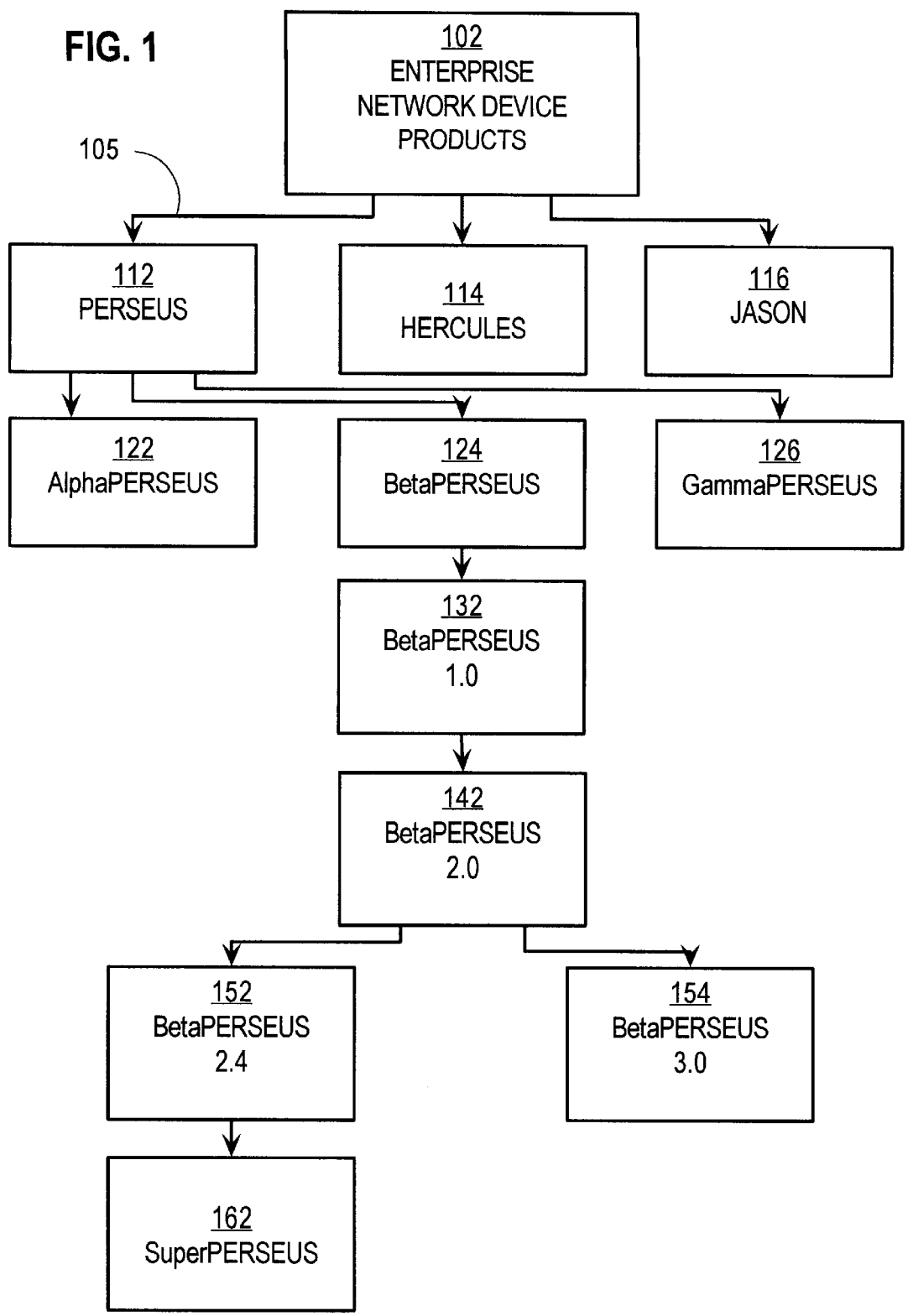

QUERY TRANSLATION SYSTEM FOR RETRIEVING BUSINESS VOCABULARY TERMS

CROSS-REFERENCE TO RELATED APPLICATIONS

This application is related to and claims domestic priority from prior U.S. Provisional application Ser. No. 60/252,378, filed Nov. 20, 2000, the entire disclosure of which is hereby incorporated by reference as if fully set forth herein.

This application is related to U.S. utility patent pending application Ser. No. 09/823,819 filed on Mar. 30, 2001, entitled "Business Vocabulary Data Storage Using Multiple Inter-Related Hierarchies" filed on the same day herewith, by inventors M. Kirkwood et al., which is hereby incorporated by reference in its entirety.

FIELD OF INVENTION

The present invention generally relates to data processing in the field of vocabulary management as applied to workflow management. The invention relates more specifically to translating queries from an external system for retrieving vocabulary data from a vocabulary development server.

BACKGROUND OF THE INVENTION

Through economic growth, mergers and acquisitions, business enterprises are becoming ever larger. Further, large business enterprises in the field of high technology now offer ever larger numbers of products and services that derive from an increasingly large variety of technologies.

In this environment, managing the creation, use, and maintenance of product names and technology names is an acute problem. As an enterprise grows, maintaining consistent usage of names of products and services throughout the enterprise becomes even more challenging. When an enterprise derives its business opportunities from research and development into new technologies or improvements of existing technologies, maintaining consistent usage of technology designations is a challenge, especially when there is disagreement about the uses, advantages or benefits of a particular technology.

Large enterprises that own or operate complex Web sites or other network resources that contain product and technology information face a related problem. Specifically, ensuring consistent usage of product names and technology terms across a large, complicated Web site is problematic. A particular problem involves maintaining consistent use of terms when different parts or elements of the Web site are authored by different individuals or groups.

Yet another problem in this context pertains to retrieving product information and technology information. Visitors to the large enterprise Web site do not necessarily know the "official" name of a product or technology. As a result, new visitors tend to query the Web site for product information based on incorrect terms, imprecise terms, related terms, or names that are unofficial. When a visitor searches using the wrong product name, the visitor is unable to retrieve the desired product information, and the visitor may become frustrated. However, this is undesirable from a promotional standpoint; the customer should be able to issue a "wrong" query and yet still retrieve the correct information.

Based on the foregoing, there is a clear need for improved ways to manage one or more vocabularies of product names and technology terms. In particular, there is a need for a way to structure name information so that it can be located and navigated easily. There is also a need for a way to share and propagate changes to name and terminology information.

There is a specific need for a clear and consistent way to develop new product brands and names that promotes consistency in terminology, style and presentation.

There is a need for a way to deliver information that is relevant to a user query in response to non-standard or alternative terms.

There is also a need for a simple, automated, unified and consistent way to manage usage of product names and technology terms in business documents and online resources such as Web sites.

There is also a need for a workflow management system that can control processes through which new product names are created, control the format and style of the names, and manage development of names and technology designations by individuals who are distributed among many groups of a large enterprise.

There is also need for a system that is extensible or adaptable when new products and technologies are developed by diverse, distributed groups in a large business enterprise.

SUMMARY OF THE INVENTION

The foregoing needs, and other needs and objects that will become apparent from the following description, are achieved in the present invention, which comprises, in one aspect, a method of translating queries for related concepts in a database of concepts and relationships among concepts. The database is local to a concept server. A query originates from a concept client. The method includes translating the query for related concepts into a markup language in a first document at a concept client. The first document is sent to a concept server over a network, and a second document in the markup language is received over the network from the concept server. The second document includes results based on responses from the concept server. The markup language in the second document is translated into values of the related concepts at the concept client.

In another aspect, the present invention includes a method of translating queries for related concepts in a database of concepts and relationships among concepts. The database is local to a concept server. A query originates from a concept client. The method includes receiving at a concept server process over a network a first document from a concept client. The first document includes the query for related concepts that has been translated into a markup language. A set of one or more operations performed by the concept server process is determined based on the first document. The set of operations are invoked. A second document in the markup language is generated and stored. The second document includes results based on responses from the operations that are invoked. The second document is sent to the concept client over the network for translation into values of the related concepts at the concept client.

In another aspect, the present invention includes a method of obtaining related concepts in a database of concepts and relationships local to a concept server at a remote concept client. The method includes generating and storing a first document at the remote concept client that aggregates multiple requests for related concepts in the database. The first document is sent to a concept server over a network. A second document is received from the concept server over the network. The second document includes results based on responses from the concept server. Values of related concepts are extracted from the second document.

In another aspect, the present invention includes a method of providing related concepts in a database of concepts and relationships local to a concept server process to a remote concept client process. The method includes receiving at a concept server from a remote concept client over a network a first document. The first document includes multiple requests for related concepts in the database. A set of operations performed by the concept server is determined based on the first document. The set of operations are invoked. A second document is generated and stored. The second document aggregates results based on responses from the operations invoked. The second document is sent to the remote concept client over the network for retrieving values of the related concepts at the remote concept client.

In another aspect, the present invention includes a method of translating a query for concepts in a business vocabulary database of concepts and relationships among concepts.

The method includes receiving at a client site on a network, from a provider of the business vocabulary database, a client-side adapter library of methods. The client-side library includes a method for translating a query for related concepts in the database into one or more elements of a first document. The client-side library also includes a method for extracting a set of values of the related concepts from one or more elements of a second document. A concept client process for the client site is developed based in part on the client-side adapter library. The concept client process generates a first query uses a first set of values of related concepts. The concept client process is executed to translate a particular first query into a particular first document, to send the first document to a concept server process, and to extract a particular set of values of related concepts from a particular second document. The particular second document includes results returned from the concept server process.

In another aspect, the present invention includes a method of translating a query for concepts in a business vocabulary database of concepts and relationships among concepts. The method includes generating a client-side adapter library of methods and sending the client-side library from a provider of the business vocabulary database to a client site on a network. The client-side library includes a method for translating a query for related concepts in the database into one or more elements of a first document. The client-side library also includes a method for extracting a set of values of the related concepts from one or more elements of a second document. A concept server process is developed based on a server-side adapter library of methods. The server-side library includes a method for determining a set of operations performed by a database server based on the first document. The server-side library also includes a method for generating and storing a second document that aggregates results from the set of operations as one or more elements. The methods of the client-side adapter library may extract values from the second document. The concept server process is executed to receive a particular first document from a particular concept client process, to determine a particular set of operations based on the particular first document, to cause the database server to perform the particular set of operations, to generate and store a particular second document including results based on responses from the set of operations, and to send the particular second document to the particular client process.

In other aspects, the invention encompasses computer readable media, and systems configured to carry out the foregoing steps.

These techniques allow remote and external applications to efficiently query for business vocabulary terms related by one or more relationships without requiring a knowledge of the organization of the persistent storage for the vocabulary database or the form of the markup language used in documents sent over the network between the concept server and the concept client. With these techniques, retrievals of related concepts, which involve complex transactions between a calling routine and the database, can be performed largely at the concept server, sparing the network much message traffic. Furthermore, by providing for a client-side adapter library, the developer of the concept client is spared the details of translating between the markup language used in the first and second documents and the queries and resulting values used by the client.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates a hypothetical product type hierarchy;

DETAILED DESCRIPTION OF THE PREFERRED EMBODIMENT

Figure 2A:
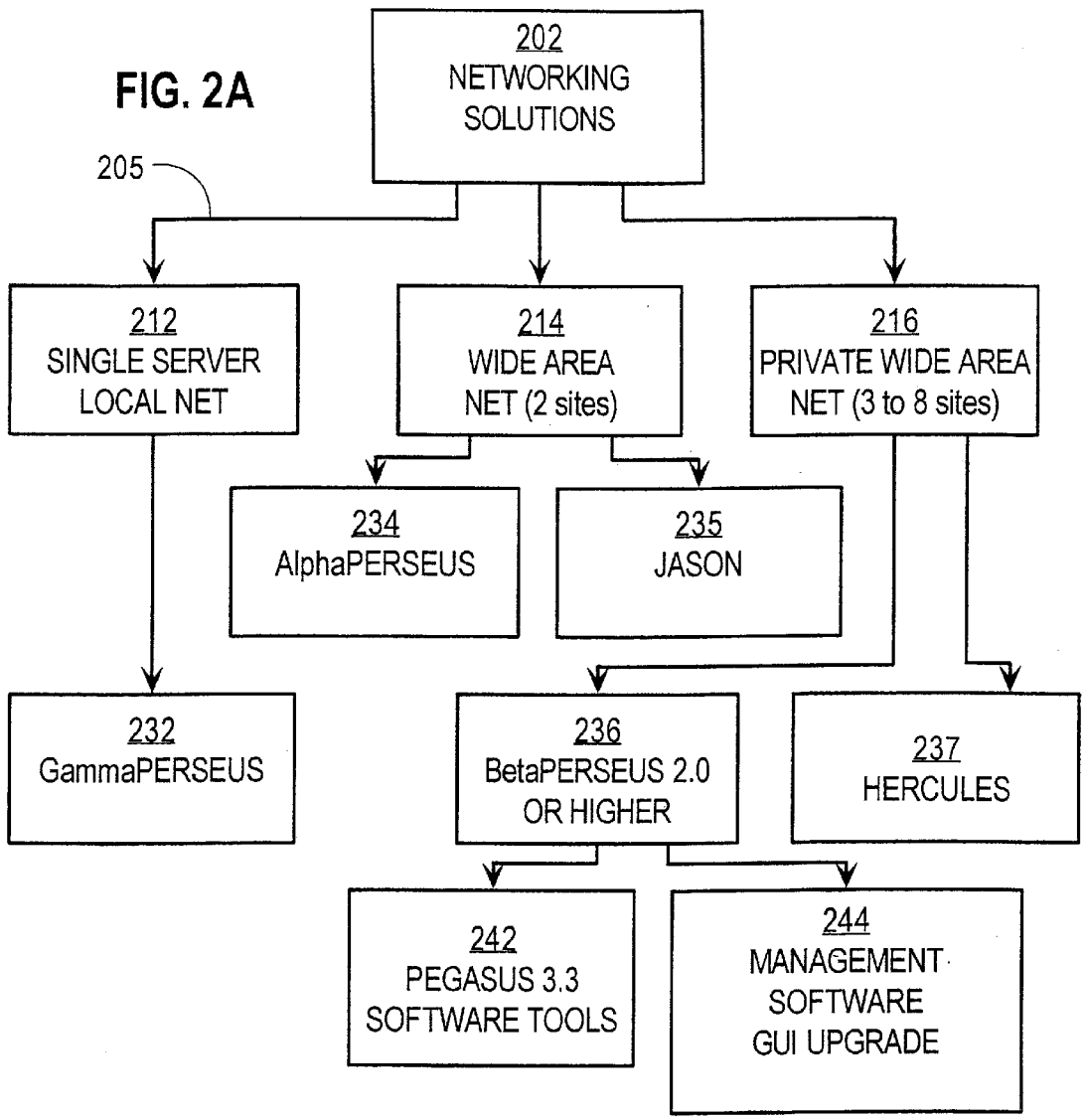
FIG. 2A is a block diagram that illustrates a networking solutions hierarchy including one or more concepts from the product type hierarchy of FIG. 1.

A method and apparatus are described for translating queries from an external system to retrieve vocabulary data from a vocabulary development server. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Business Vocablary Data Processing

Business vocabulary terms are used to name products, product lines, technologies, development efforts and other business activities of an enterprise. Some of the vocabulary terms are used only internally and some are used for interaction with the public to establish brand name recognition or to support precise communication of customer interests and orders. Terms related in meaning or form are used to associate related business products and activities in the minds of the users of those terms. For example, a device sold by an enterprise might be named Perseus, after a hero of Greek mythology, and a software program for executing on that device might be named Pegasus, after the winged horse Perseus rode. Similarly, different models of the Perseus device might be called AlphaPerseus and BetaPerseus, to show they are part of the same product line, while different versions of each model may be numbered, such as BetaPerseus 2.0 and BetaPerseus 2.4.

The present invention is based in part on a recognition that the business terms of an enterprise constitute an important type of business data that should be included in the automated data processing that the enterprise performs. This vocabulary data about the products, services and activities of a business is a form of metadata for the products, services and activities of the enterprise. Those terms can be used to categorize the products, services and activities and to retrieve other data about those products, services and activities. The data structures employed to store, retrieve and process this metadata should account for the associations in meaning and form and support rapid associative or inferential search and retrieval.

2.0 Vocabulary Data Framework

According to the present invention, the various terms that constitute the business vocabulary of an enterprise are modeled as nodes in a hierarchy called the MetaData Framework (MDF) or the Vocabulary Data Framework (VDF). In this framework, any business term that is derived from another particular business term is positioned in the hierarchy at a node that branches from the node of that particular business term from which it is derived. When the hierarchy is embodied in stored data with appropriate data structures and software programs, it is extremely useful in naming products and associating products with product lines.

For example, FIG. 1 shows a hypothetical product type hierarchy for a hypothetical enterprise that manufactures and sells network devices. In this hierarchy, node 102 is a root node representing network device products sold by the enterprise. Node 102 has three child nodes, 112, 114, 116 that are connected by arrows 105. The parent/child relationship is denoted by an arrow pointing from parent to child in FIG. 1. A relationship statement can be obtained reading from arrow head to arrow tail by the words "is a child of" or read in the opposite direction by the words "is a parent of." Thus node 112 is a child of node 102. Node 102 is a parent of node 112. In the product type hierarchy of FIG. 1, arrow 105 represents the product type parent/child relationship.

Node 112 represents the devices named "Perseus." In this embodiment, the content of node 112 includes "Perseus." Nodes 114, 116 represent devices named "Hercules" and "Jason," respectively. FIG. 1 shows that the Perseus device comes in three models, "AlphaPerseus," "BetaPerseus" and "GammaPerseus," represented by the three nodes 122, 124, 126, respectively. The BetaPerseus model has evolved over time through versions 1.0, 2.0 and 3.0, represented by nodes 132, 142, 154, respectively. The contents of these nodes hold the names "BetaPerseus 1.0," BetaPerseus 2.0," and "BetaPerseus 3.0," respectively. BetaPerseus 2.0 also experienced some evolutions called "BetaPerseus 2.4" and "SuperPerseus," which are represented by nodes 152, 162, respectively.

This hierarchy consists of binary relationships; that is, each relationship requires one parent and one child. The product type relationships of FIG. 1 are constrained by a rule that each child may have only one parent. There is no rule restricting the number of children a parent may have in this hierarchy.

Various applications use the information in the VDF implementation to perform different functions for the enterprise. In one application, the VDF relationships in the illustrated hierarchy are used to determine that the product named "SuperPerseus" is actually a version of the BetaPerseus model that is based on version 2.4. In another application, the VDF content is used to help provide names for products as new products are developed by automatically including the product type and model name and by preventing the re-use of an existing version number. Embodiments of this application enforce a rule that each name shall be unique. The enterprise uses the VDF with other embodiments of such an application to enforce other naming rules, such as requiring the model name shall be part of the device name. In this case the ambiguous name "SuperPerseus" is not allowed, and is discarded in favor of the automatic name, "BetaPerseus 2.5", or some allowed variation of that, which is stored as the content of node 162.

The vocabulary data framework (VDF) captures simultaneous multiple relationships among names, products, solutions, services, documentation and activities for an enterprise. In particular, the VDF allows other relationships to be established between nodes simultaneously with the product type relationship. Furthermore, the VDF allows any of these new relationships to involve more than the two nodes of the binary parent-child relationship already described. For example, it allows a ternary relationship among a father node, a mother node, and a child node. In general, the VDF allows N-ary relationships among nodes, where N is any integer equal to or greater than one and specifies the number of participants in the relationship.

In the more general realm of the VDF, the enterprise is considered a data domain that includes many atomic concepts that may be related. Atomic concepts include any data item involved in the enterprise that is not subdivided into separately referenced storage units. These atomic concepts include the business vocabulary for the enterprise data that is the subject of the present invention. Concepts include product type names, as in the above example, but also comprise paragraphs, chapters, documents, images, multimedia files, database records, database queries, network resources, citations, and network addresses, among other things. The concepts and relationships are captured in conceptual graphs which are organized primarily by a partial-order relationship, commonly known as a type hierarchy. The concepts are nodes in the graph and the relationships are connections between two or more nodes. Both concepts and relationships have enumerated characteristics in some embodiments.

The graph of FIG. 1 is an example of a conceptual graph ordered by its product type hierarchy of binary (parent-child) relationships. Whereas this is one example based on a product type hierarchy, the VDF allows for simultaneous and inter-related multiple type hierarchies, as is explained in more detail in the following sections.

2.1 Multiple Hierarchies

As seen above in FIG. 1, concepts are related in a graph depicting product types. All the concepts in this graph are associated with one category of information in the enterprise data. That category is device product types, and that hierarchy relates concepts for products that are related in development history, structure or function. However, enterprise data may include other categories or relationships. In general, multiple categories encompass the enterprise data.

For example, some of the enterprise data for an enterprise that manufactures and sells network devices are related to equipment solutions for common networking problems encountered by customers of the enterprise. Products of the enterprise that are unrelated by the hierarchy of FIG. 1 nevertheless may be useful to solve the same kind of customer problem. Thus, such products relate to the same solution. To reflect these relationships, enterprise data also are placed in a category called networking solutions in one embodiment, and are organized in a solutions hierarchy that exists concurrently with the product type hierarchy.

FIG. 2A depicts an example hierarchy of concepts in a networking solutions category. In this example, three solutions expressed by the concepts "single server local net," "wide area net (2 sites)" and "private wide area net (3 to 8 sites)" are stored in the content of nodes 212, 214, 216, respectively. All three nodes are children of the root node 202 having content "networking solutions" for this category of concepts. In the solutions type hierarchy of FIG. 2A, arrow 205 represents a networking solutions parent/child relationship. All the relationships represented by arrows in FIG. 2A are of this type. This relationship type differs from the product type parent/child relationship represented by arrow 105 of FIG. 1. Both relationship types are parent/child binary relationships, but they relate concepts in different categories.

As shown in the example of FIG. 2A, the product GammaPerseus, at node 232, is part of the equipment solution for single server local networks of node 212. Both AlphaPerseus, at node 234 and Jason at node 235 are part of the equipment solution for wide area networks connecting two sites, at node 214. BetaPerseus 2.0, at node 236, and Hercules, at node 237, are part of the equipment solution for private wide area networks connecting three to eight sites represented by node 216. Nodes 242 and 244 represent software products Pegasus 3.3 and a graphical user interface (GUI) upgrade that are installed on the BetaPerseus 2.0 device in addition to the default software that comes with that device.

The concepts at nodes 202, 212, 214, 216 may be placed in a category called networking solutions. The concepts 232, 234, 235, 236, 237 have already been placed in a category called enterprise device products; but they may also be placed in the category networking solutions. The concepts at nodes 242, 244 may be placed in a category called software products and also in the networking solutions category. FIG. 2A demonstrates that hierarchies of concepts in categories of enterprise data may be defined in addition to the hierarchy of concepts in the product type category, and demonstrates that categories may overlap.

Alternatively, non-overlapping categories are used in other embodiments. In such an embodiment, the relationship represented by arrow 205 is expressed as a relationship of a sub-component to a component of a networking solution, in which the sub-component may be a different category than the component. Rules can be expressed for the relationship. One possible rule is: software can be a sub-component of hardware, but not the other way around. Similarly, a product can be a sub-component of a networking solution category but not the other way around.

2.2 Non-Binery Relationships

Figure 2B:
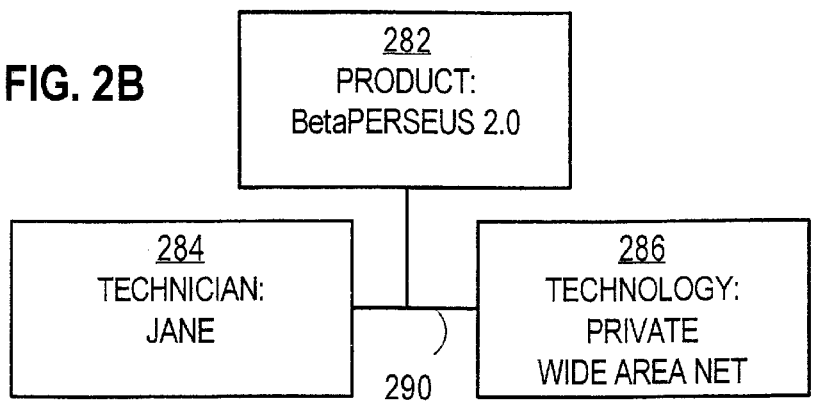
FIG. 2B is a block diagram that illustrates a non-binary relationship among concepts.

FIG. 2B depicts a conceptual graph of an example non-binary relationship. This ternary relationship (also called a 3-ary relationship or three participant relationship) is useful for capturing the expertise of a person in the use of a product in a technology area. In this example, this relationship is used to state whether the expertise of a technician in the use of a product device within a technology area is of a quality that can assume values of "unknown," "poor," "average," "good," or "excellent."

The characteristics of the relationship type describe the number of participants and their category or categories. In this example the relationship type includes characteristics that indicate there are three participants, one from the user category, one from the technology category and one from the product device category. In addition, the characteristics of this relationship include at least one relationship value for storing the quality of expertise (unknown, poor, average, good, excellent). More details on defining and storing concepts and relationships are given in a later section.

The conceptual graph of this relationship in FIG. 2B shows three nodes 282, 284, 286 representing the three concepts, e.g., product BetaPerseus 2.0, technology private wide area network, and technician Jane, respectively. The three nodes are connected by a three-way, non-directional link 290. The link 290 includes an attribute named "quality" that takes on a value such as "good," indicating that Jane's expertise is good for using BetaPerseus 2.0 in private, wide area networks.

2.3 Documentation Category

Another category of concepts that is extremely useful to an enterprise, for both internal and external users, is documentation concepts. Concepts within a documentation category include headings, sections, paragraphs, drawings, and images, among others. Documentation concepts may be organized in a hierarchy that facilitates automatically generating accurate, complete, up-to-date visual or printed documentation pertaining to a particular product or service. For example, a device, like the hypothetical Beta Perseus 2.0, can be linked by a relationship to a document concept describing the device. As another example, a device, like the Beta Perseus 2.0, can be linked by a relationship to a section concept in a document hierarchy for a document concept describing the networking solutions of which the device is a component. More examples of document categories of concepts are given in a later section.

2.4 Multiple Inter-Related Hierarchies

As seen in the above examples, a single concept, such as the device product BetaPerseus 2.0 may appear in several separate hierarchies. According to one embodiment, information defining the concept is stored only once in the VDF and relationships are defined to all other nodes to which the concept is adjacent in all the hierarchies.

Hierarchies may be implemented using object-oriented programming techniques and database servers. One advantage of this approach is that changes to the concept can be made in only one location in the VDF and all hierarchies immediately become up-to-date and reflect the changes. Further, all information generated based upon the hierarchies, such as documentation or screen displays, automatically reflects the changes.

Another advantage is that applications that retrieve the data can navigate one of the hierarchies to a particular concept and then immediately find the other hierarchies in which that concept occupies a node. Thus, a customer who has purchased a particular device product for one networking solution can determine other solutions that use that same device. The customer follows the current solution to the product and then reviews the relationships with other networking solutions of interest to the customer that utilize the device. When a networking solution of interest is found using the device, the newly found solution can be navigated above and below the node representing the device concept in order to determine what software and other devices, if any, are components and sub-components of the new solution. Further, the customer can search by solution and identify multiple products that can satisfy the solution. The customer can then inspect each of the products, obtain its documentation, and determine which product is best suited to the customer's particular needs.

Figure 3:
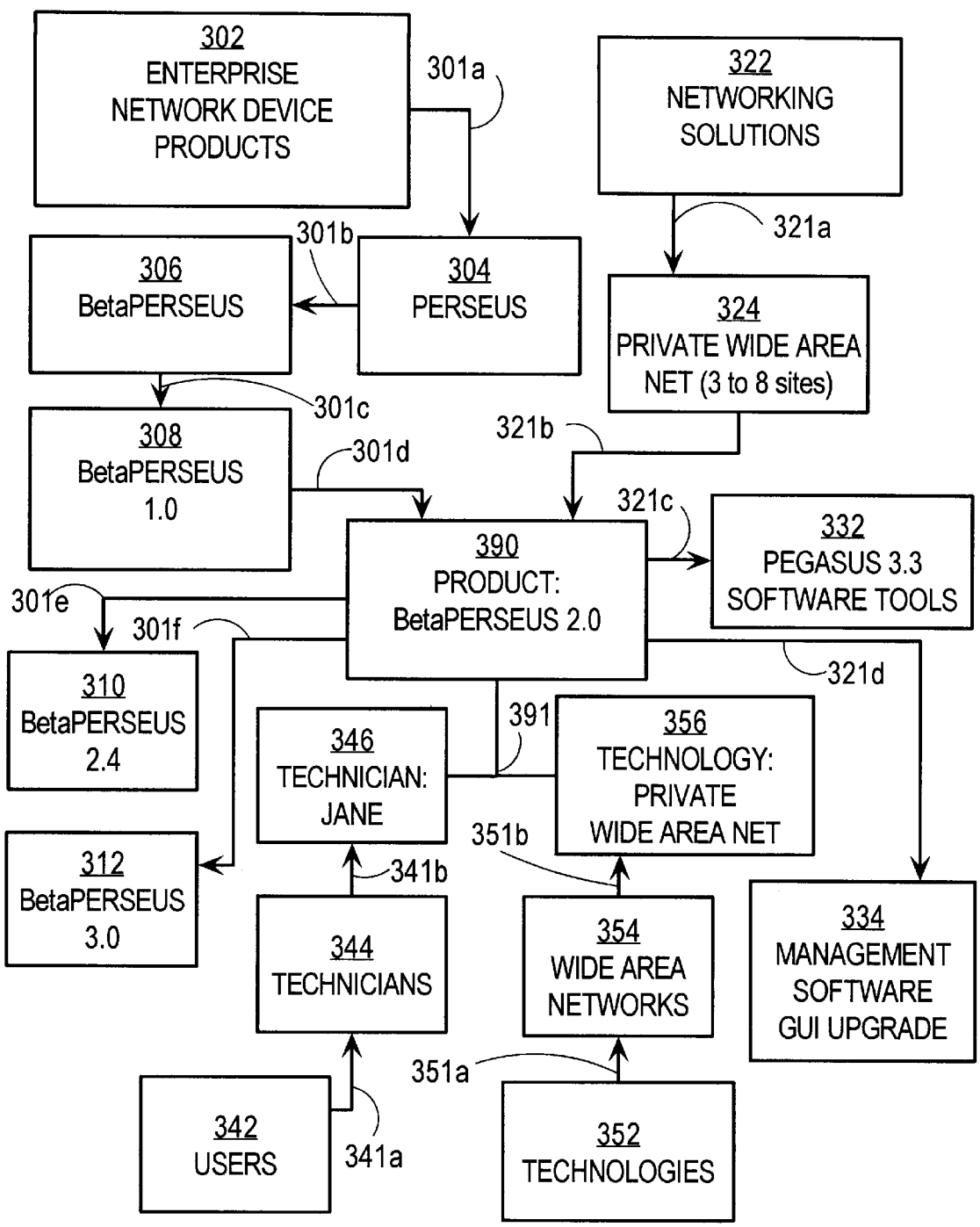
FIG. 3 is a block diagram illustrating simultaneous multiple inter-related hierarchies involving a product type concept.

FIG. 3 is an example of a conceptual graph for multiple inter-related hierarchies that are associated with the device product BetaPerseus 2.0, based on the individual hierarchies and relationships of FIG. 1, FIG. 2A and FIG. 2B. The branch of the device product type hierarchy of FIG. I that includes the BetaPerseus 2.0 device concept appears as nodes 302, 304, 306, 308, 390, 310 and 312 linked by the device product type, binary parent/child relationships 301. The branch of the device networking solutions hierarchy of FIG. 2A that includes the BetaPerseus 2.0 device appears as nodes 322, 324, 390, 332 and 334 linked by the networking solutions type, binary parent/child relationships 321. The 3-participant expertise relationship 391 links the node 390 for the BetaPerseus 2.0 to the concept "Jane" at node 346 and the concept "private wide area networks" at node 356. Also shown is that the concept "Jane" at node 346 is a child of the concept "technicians" at node 344 which is a child of the concept "users" at node 342. These nodes are linked by user type, binary parent/child relationships represented by arrows 341. Also shown is that the concept "private wide area networks" at node 356 is a child of the concept "wide area networks" at node 354 which is a child of the concept "technologies" at node 352. These nodes are linked by technology type, binary parent/child relationships represented by arrows 351.

The BetaPerseus 2.0 concept at node 390 is linked to the following nodes in multiple inter-related hierarchies. The BetaPerseus 2.0 concept at node 390 is a product type child of the BetaPerseus 1.0 concept at node 308, as represented by arrow. 301d. The BetaPerseus 2.0 concept at node 390 is a product type parent of the BetaPerseus 2.4 concept at node 310, as represented by arrow 301e, and the BetaPerseus 3.0 concept at node 312, as represented by arrow 301f. The BetaPerseus 2.0 concept at node 390 is further a solutions type sub-component of the private wide area net (3 to 8 sites) concept at node 324, as represented by arrow 321b. The BetaPerseus 2.0 concept at node 390 has solutions type sub-components of the Pegasus 3.3 software tools concept at node 332, as represented by arrow 321c, and the management software GUI upgrade concept at node 334, as represented by arrow 321d. The BetaPerseus 2.0 concept at node 390 has two companion expertise type participants as represented by link 391; one at Jane represented by node 346 and one at private wide area networks represented by node 356. In all, the example concept at node 390 has 6 binary relationships and one ternary relationship with eight nodes in four hierarchies (product type, equipment solutions, users and technologies). Each of the concepts and relationships may be represented using stored data in a database or appropriate programmatic data structures.

Many of the other nodes in FIG. 3 may have relationships with other hierarchies in addition to the relationships shown. These other relationships are omitted so that FIG. 3 and this discussion are more clear. Multiple relationships similar to the examples listed for node 390 may be defined for these other nodes.

2.5 Root Concepts

At the top of each hierarchy for each category is a category root node representing the category root concept from which all the other concepts in the category branch. For convenience in navigating from one category to the next, each of the category root nodes is made a child of an enterprise data root node representing a top-level pseudo-concept for the enterprise data. In one embodiment, the pseudo-concept is "Vocabulary," and every node related to the Vocabulary concept by a direct "child of" relationship is a root node representing a root concept for one category.

2.6 Implementation of the VDF

One embodiment uses a rule-base and declarative computation approach to express the concepts, relationships and rules of the VDF. This approach may be implemented using a high level logical processing language such as PROLOG™. The high level logical processing language translates statements declaring types and statements expressing rules about combining types into another language, such as the C programming language, that can be compiled and run on a large variety of general-purpose computer platforms.

In this embodiment, the concepts, relationships, attributes and logical implications (including integrity constraints and general computations) are expressed as logical assertions. There are two kinds of logical assertions, facts and rules. A fact is a logical assertion that is considered unconditionally true. A rule is a logical assertion whose truth or lack of truth depends on the truth or lack thereof of other assertions. In this implementation, concepts, relationships and attributes are generally represented as facts, whereas logical implications are represented using rules.

2.6.1 Defining Concepts

For example, in one embodiment, a statement declaring that the phrase BetaPerseus 2.0 is a concept is presented in a high level logical processing language by the expression:

('BetaPerseus 2.0', isConcept)

Similar expressions are used to enter the other concepts in the vocabulary.

The concept may have several attributes besides the phrase that defines it. For example the concept may have a creation date and an author. Attributes of a concept are presented with the following expression:

('BetaPerseus 2.0', 'creation', '9/19/2000', 'author', 'John Smith')

2.6.2 Defining Relationships

The relationships that constitute a hierarchy connect one concept to one or more other concepts. Relationships are defined with the following expression:

(r('ConceptX', 'ConceptY', 'ConceptZ'),relationship (rID))

where r is a name for the relationship type, ConceptX, ConceptY and ConceptZ are the three concepts related by this statement, making the relationship r a ternary relationship, and this particular relationship has a unique relationship identification number rID. To ensure uniqueness, the value of rID is supplied when the relationship is defined by the system performing the logical processing. Using this expression, the "product type child of" relationship can be defined by the statement:

(product_child_of ('BetaPerseus 2.0', 'BetaPerseus 1.0')., relationship (rID2)).

According to this statement, the relationship rID2 links BetaPerseus 2.0 to BetaPerseus 1.0 by a relationship of relationship type "product_child_of."

The ternary relationship of FIG. 2B is defined, after each of the individual concepts are defined, by the expression:

(expertise('BetaPerseus 2.0', 'Jane', 'wide area networks'),relationship (rID3).

According to this statement, the relationship rID3 links the concept BetaPerseus 2.0 with the concept 'Jane' and the concept 'wide area networks' by a relationship of type "expertise."

Similarly, a marketing document stored as a Web page on a network and identified by its universal resources Locator (URL) address 'http:///www.Enterprise.com/literature/devices/catalog/Chap2/' is related to the concept 'BetaPerseus 2.0' by the expression:

(marketDoc('BetaPerseus 2.0', 'http:///www.Enterprise.com/literature/devices/catalog/Chap2/') relationship (rID4))

The system returns a unique value for rID4, which is used to reference this particular relationship of type marketDoc in later statements.

The relationships defined above can also be given attributes according to this embodiment. Typical relationship attributes include the author of the relationship and the date the relationship is created. These attributes are set for a relationship having an unique identification of rID1 with the expressions:

(rID1, 'creator', 'John Dow')

(rID1, 'date', '10/10/2000').

Relationships may have other attributes. For example, the expertise relationship defined above has an attribute for the quality of the expertise, which, in the instance of Jane on wide area networks for the BetaPerseus2.0, is good. This attribute is expressed in this embodiment as follows (rID3, 'quality', 'good')

where rID3 is the unique identification for the expertise relationship among Jane, BetaPerseus 2.0 and wide area networks returned by the system when the relationship was created, as described above.

A relationship can also be defined for other relationships. For example, a relationship of type "revision" is used to track changes in another relationship.

(revision (rID5, rID6), relationship (rID7))

The use of the revision relationship is illustrated in the following. If the marketing document for the BetaPerseus 2.0 is changed to a different URL, 'http:///www.Enterprise.com/Hello/Chap2/', a new relationship is formed by the statement (marketDoc('BetaPerseus 2.0', 'http:///www.Enterprise.com/Hello/Chap2/'), relationship (rID8))

To show that his new relationship with identification rID8 is just a revision of the old relationship with identification rID4 (see above), the revision relationship type is used as follows:

(revision (rID4, rID8), relationship (rID9))

Now, relationship rID9 associated with old relationship rID4 can be used to determine the new relationship rID8 that replaces the old relationship rID4.

2.6.3 Defining Rules

The hierarchies that relate concepts may have to follow certain rules. For example, as stated above, the product type hierarchy requires that a child have only one parent. These rules are enforced using logical constraints defined in a high level logical processing language as rules. A constraint that detects multiple parents in a set of expressions in the high level logical processing language of one embodiment is given by the expression:

(constraint(ConceptC, multiparent (ConceptP 1, conceptP2)))
  if (ConceptC, childOf, ConceptP1), (ConceptC, childOf, ConceptP2), ConceptP1~=ConceptP2.

which reads, ConceptC has multiple parents ConceptP 1 and ConceptP2 if ConceptC is a child of ConceptP1 and ConceptC is a child of ConceptP2 and ConceptP1 is not equal to ConceptP2. A statement is inserted which throws an error if the multiparent constraint is detected.

Another example of a rule that is enforced in the high level logical language as a constraint is the rule that every concept must be a descendent of a root concept. As described above, a root concept is a concept that is a child of the pseudo concept "Vocabulary." A concept is a descendent of the concept Vocabulary if the concept Vocabulary is reachable from the concept by a succession of one or more "child of" relationships. If the concept Vocabulary cannot be reached from a given concept, then the given concept is an orphan concept. Orphan concepts are a violation of the rules for the product type hierarchy and generally result from errors in concept definitions or are introduced when a parent concept is deleted from the hierarchy. This constraint depends on a definition of "reachable." Reachable is defined as follows:

(reachable(ConceptX,ConceptY)) if (ConceptX, childOf, ConceptY)

(reachable(ConceptX,ConceptY)) if (reachable (ConceptX,ConceptW)), (reachable (ConceptW,ConceptY))

which reads, ConceptX reaches ConceptY either if ConceptX is a child of ConceptY or if there is a ConceptW such that ConceptX reaches ConceptW and ConceptW reaches ConceptY. The constraint is then expressed as follows:

(constraint (ConceptC, orphanConcept)) if ~(reachable (ConceptC,'Vocabulary'))

which reads, ConceptC is an orphan concept if ConceptC does not reach the pseudo concept "Vocabulary." A statement is inserted which throws an error if the orphanConcept constraint is detected.

As discussed above, the example expressions presented in this section are processed by the high level logical processing system to generate code, such as C language code, that implements the concepts, relationships and constraints defined in these expressions. The C language code can then be compiled and executed on any computer system with a C compiler. Further, the C language code can be incorporated in other application programs or compiled into libraries having functions that are called from separate application programs.

3.0 Vocabulary Database

A vocabulary database provides persistent storage for the concepts, relationships, and rules of the vocabulary data framework for the enterprise data.

3.1 A Relational Database Embodiment

One embodiment uses a relational database to store the concepts and the relationships among concepts and the rules. A relational database uses a schema to describe a series of tables each made up of one or more rows, each made up of one or more fields. The schema names the table and the fields of each row of the table. An example relational database schema to implement the VDF according to one embodiment is described below. In some embodiments the relational database includes a unique row identification number (rowID) for each row in each table.

In this embodiment, a vocabulary table includes a row for each root concept in the VDF. The fields of each row include the concept name, the concept description and the creation date, as shown in Table 1. A unique rowID may also be included in each row but is not shown in the example tables.

Example root concepts are included in several rows of Table 1.

TABLE 1

The Vocabulary Table

| Root Category Name | Description | Creation Date |
|---|---|---|
| Product | Product category | 4/12/2000 |
| User | User category | 4/12/2000 |
| Technology | Technology Category | 5/15/2000 |
| Solution | Networking Solutions Category | 4/12/2000 |

Each root concept in the vocabulary table has its own table comprising one row for every concept within the category. All concepts that are descendants of the root concept via the "child of" relationship are stored in the table defined by the root concept. Table 2 is an example Table for the Product root concept.

TABLE 2

The Product Category Table

| Name | Description | Creation Date |
|---|---|---|
| Network Device Products | Enterprise devices | 4/12/00 |
| Perseus | router product | 4/12/00 |
| Hercules | gateway product | 4/12/00 |
| Jason | hub product | 4/12/00 |
| AlphaPerseus | router product | 4/12/00 |
| BetaPerseus | router product | 6/16/00 |
| BetaPerseus 1.0 | router product | 6/16/00 |
| GammaPerseus | router product | 9/19/00 |
| BetaPerseus 2.0 | router product | 9/19/00 |
| BetaPerseus 2.4 | router product | 12/12/00 |
| BetaPerseus 3.0 | router product | 1/01/01 |
| SuperPerseus | router product | 2/01/01 |

Several tables are employed to store relationships. These tables support N-ary relationships. The relationship type table holds one row for each relationship type, as illustrated in Table 3 for some sample relationship types described above. The table rows include fields for the name of the relationship type, as used in the high level language or conceptual graphs, a fuller description of the relationship, the number of participants and the creation date.

TABLE 3

The Relationship Types Table

| Relationship Type Name | Description | Number of Participants | Creation Date |
|---|---|---|---|
| product_child_of | product lineage | 2 | 4/12/2000 |
| solution_child_of | solution lineage | 2 | 4/12/2000 |
| user_child_of | user categories | 2 | 4/12/2000 |
| technology_child_of | technology lineage | 2 | 4/12/2000 |
| expertise | expertise of person with product in technology | 3 | 0/01/2001 |
| MarketDoc | Marketing document for product | 2 | 9/19/2000 |
| Revision | track revisions in concepts/relationships | 2 | 2/01/01 |

The participant type table holds one row for each role of a participant type in a relationship type, as illustrated in Table 4 for the example relationships of Table 3. This table has a row for each participant of each relationships type. Each row has fields for the name of the relationship type, the role of the participant in the relationship, and the participant type, which is the category of the concept that may fill the given role in the relationship type.

TABLE 4

The Participant Types Table

| Relationship Name | Role | Participant Type |
|---|---|---|
| product_child_of | child | Product |
| product_child_of | parent | Product |
| solution_child_of | child | Networking Solution/Product |
| solution_child_of | parent | Networking Solution/Product |
| user_child_of | child | User |
| user_child_of | parent | User |
| technology_child_of | child | Technology |
| technology_child_of | parent | Technology |
| expertise | person | User |
| expertise | product | Product |
| expertise | technology | Technology |
| marketDoc | product | Product |
| marketDoc | document | Document |
| revision | old version | Vocabulary/relationshipID |
| revision | new version | Vocabulary/relationshipID |

The relationship instance table (Rinstance table) and the participant instance table (Pinstance table) have entries for every instance of the relationships as it is defined for the enterprise data example Rinstance table is shown in Table 5 and an example Pinstance table is shown in table 6, for some of the relationships described above. When a particular relationship is defined between two or more concepts, a new relationship identification (rID) is generated in one embodiment the particular relationship ID, rID, is the unique rowID corresponding to the next row in the Rinstance table.

TABLE 5

The Relationship Instance (Rinstance) Table

| rID | Relationship Type Name | Creation Date |
|---|---|---|
| 5000 | product_child_of | 9/19/2000 |
| 5001 | marketDoc | 9/19/2000 |
| 5002 | product_child_of | 9/19/2000 |
| 5003 | expertise | 9/19/2000 |
| 5004 | marketDoc | 9/20/2000 |
| 5005 | revision | 9/20/2000 |

When a "product child of" relationship is created between the BetaPerseus 2.0 and Beta Perseus 1.0 Sept. 19, 2060, an entry is made into a row of Table 5 and a unique rID of "000" is generated by the system. Then two rows are added to Table 6 for the two concepts that participate in the "product child of" relationship that has just been added to Table 5. Those two rows each list in the rID field the rID value of "5000" generated for this relationship. One row is generated in Table 6 for the concept BetaPerseus 2.0 in the participant role of child for rID "5000." A second row is generated in Table 6 for the concept BetaPerseus 1.0 in the participant role of parent for rID "5000."

TABLE 6

The Participant Instance (Pinstance) Table

| rID | role | Participant |
|---|---|---|
| 5000 | child | BetaPerseus 2.0 |
| 5000 | parent | BetaPerseus 1.0 |
| 5001 | product | BetaPerseus 2.0 |
| 5001 | document | http:///www.Enterprise.com/literature/devices/catalog/Chap2/' |

TABLE 6-continued

The Participant Instance (Pinstance) Table

| rID | role | Participant |
|---|---|---|
| 5002 | child | BetaPerseus 2.4 |
| 5002 | parent | BetaPerseus 2.0 |
| 5003 | person | Jane |
| 5003 | product | BetaPerseus 2.0 |
| 5003 | technology | private wide area net |
| 5004 | product | BetaPerseus 2.0 |
| 5004 | document | http:///www.Enterprise.com/Hello/Chap2/ |
| 5005 | old version | 5001 |
| 5005 | new version | 5004 |

On the same date, in this example, the new product is related to its marketing document with the marketDoc relationship that gets rID "5001." Its participants are listed in Table 6 the two rows having rID "5001." Later that day a new product_child_of relationship is generated for BetaPerseus 2.4 and receives rID "5002." Its participants are listed in the two rows of Table 6 with rID of "5002." Then the expertise relationship of Jane using BetaPerseus 2.0 in private wide area networking is established on the same day and gets an rID of "5003." The three participants of that relationship are added to Table 6 in the three rows with an rID value of "5003." The next day, on Sept. 20, 2000, a new marketing document is associated with the product by generating a new marketDoc relationship that receives the rID of "5004." The product and document participants are added to Table 6 in the rows showing an rID value of "5004." Finally, the revision of the marketing document is memorialized with the revision relationship, which receives an rID of "5005." The two participants of the revision relationship are added as two rows to Table 6 having an rID value of "5005" in Table 5. The two participants are the old marketDoc relationship rID of "5001" and the new marketDoc relationship rID of "5004." Though participants are listed in Table 6 with increasing values in the rID field, it is not necessary that the value of rID increase monotonically for the system to operate.

The "is a" relationship is a common relationship that also could be represented with entries in the Relationship Type, Participant Type, Relationship Instance and Participant Instance tables. However, better performance is achieved if all instances of an "is a" relationships are placed in an "Is_A" table. For one embodiment, an example Is_A table is shown in Table 7. For this example, all "product child of" relationships are kept in this Is_A table.

TABLE 7

Is_A Table.

| Concept Name | Parent Concept | Creation Date |
|---|---|---|
| Enterprise Network Device Product | Product | 4/12/2000 |
| Perseus | Enterprise Network Device Product | 4/12/2000 |
| AlphaPerseus | Perseus | 4/12/2000 |

Attributes of concepts and relationships beyond those already included in the above tables are kept in one or more attributes tables. In one embodiment, all these additional attributes of concepts are kept in a single concepts attributes table. Similarly, all the additional attributes of relationships are kept in a single relationships attributes table. Table 8 is an example concepts attributes table for the example concepts described above.

TABLE 8

Concepts Attributes Table.

| Concept Name | Attribute Name | Attribute Value |
|---|---|---|
| BetaPerseus 2.0 | author | John Smith |

Table 9 is an example relationships attributes table for the example relationships described above. The expertise relationship was described above to include an attribute called "quality" for indicating the quality of the expertise using one of the values "unknown," "poor", "average," "good," and "excellent." This relationship type occurred in the relationship having rID of 5003 as shown above in Table 5. Therefore the corresponding entry in the relationships attributes table is given in Table 9.

TABLE 9

Relationships Attributes Table.

| rID | Attribute Name | Attribute Value |
|---|---|---|
| 5003 | quality | good |

The rules that express general computations and constraints on the relationships are also stored in tables. In this embodiment, the rules are stored as text for the high level logical processing language. In this way, the stored rules can be imported directly into a rules engine program of the high level logical processing system. Table 10 is an example rules table including the reachable rule described above.

TABLE 10

Rules Table

| Rule Name | Rule Statement Sequence Number | Rule Statement |
|---|---|---|
| reachable | 1 | reachable(ConceptX,ConceptY) if (ConceptX, childOf, Concept Y) |
| reachable | 2 | reachable(ConceptX,ConceptY) if reachable(ConceptX,ConceptW), reachable(ConceptW, ConceptY) |

3.2 Additional Relational Database Tables

One embodiment of the VDF allows multiple concepts from different concept categories to have the same name. The duplicate names are converted to unique identifiers called DupIDs and the unique identifiers are used in the concept database. The duplicates table is used in the conversion process. Table 11 is an example duplicates table for an embodiment in which a product concept and a technology concept both use the name Perseus. In this case, the name inserted into the second row of Table 2 above would be "1234" instead of " "Perseus."

TABLE 11

Duplicates Table

| DupID | Name | Category |
|---|---|---|
| 1234 | Perseus | Product |
| 2789 | Perseus | Technology |

One embodiment of the VDF also allows raw terms to be stored in the database. Raw terms are words or phrases that may become a concept at a later time. Raw terms can originate from a wide variety of sources, such as a trade journal article reviewing a product or a customer order. The raw terms are stored in this embodiment in a dedicated table. Table 10 12 is an example raw term table.

TABLE 12

The Raw Terms Table

| Raw Term Name | Description | Creation Date | Category |
|---|---|---|---|
| SuperPerseus | term for BetaPerseus 2.5 coined by Reviewer A. Newman | 12/12/2000 | Product |
| P-Routers | Term for Perseus routers in customer request from Company A | 9/25/2000 | Product |

3.3 Normative and Alternative Concepts

Some embodiments of the VDF also allow alternatives for concepts. This is implemented by designating one of the concepts as the normative concept preferred to all alternatives. The alternative concepts are then related to the normative concept by an "is an alternative of" binary relationship. A constraint on this relationship is that an alternative concept can be related to only one normative concept. There are no restrictions on how many alternatives a normative concept can have.

For example, BetaPerseus 2.5 and SuperPerseus are both used to refer to the same hypothetical device. The preferred form, "BetaPerseus 2.5" is designated the normative concept, for example in the statement:

("BetaPerseus 2.5", isNormative).

This is the normative form in this example because it follows the rules for naming products such as including the model name and a unique version number. The alternative concept is designated by the "is an alternative of " relationship, for example in the statement:

(is_alternative_of('SuperPerseus', 'BetaPerseus 2.5') , relationship (rID10)).

which reads "SuperPerseus is an alternative of BetaPerseus." The alternative concept is useful in this example because, say, an article in a trade journal has used the concept in association with the device and has thus cast on potential customers some favorable impressions associated with this alternative concept.

4.0 Vocabulary Development Server

The Vocabulary Development Server (VDS) is one or more processes that provide management of and access to the enterprise data in the vocabulary database to other processes in an enterprise data processing system. Herein, the vocabulary database is also called the VDS Concept Database.

4.1 Vocabulary Development Server APIs

In the disclosed embodiment, the VDS includes several object-oriented application program interfaces (APIs). Several of the VDS APIs use function calls that are configured to allow client processes to interact with the database application without a need to know the organization of the database implementation. This allows modifications to be made to the database organization, such as adding relationships or adding or deleting levels to one or more hierarchies, without changing the client processes. All adjustments to changes in the database are accommodated in the VDS APIs.

Figure 4A:
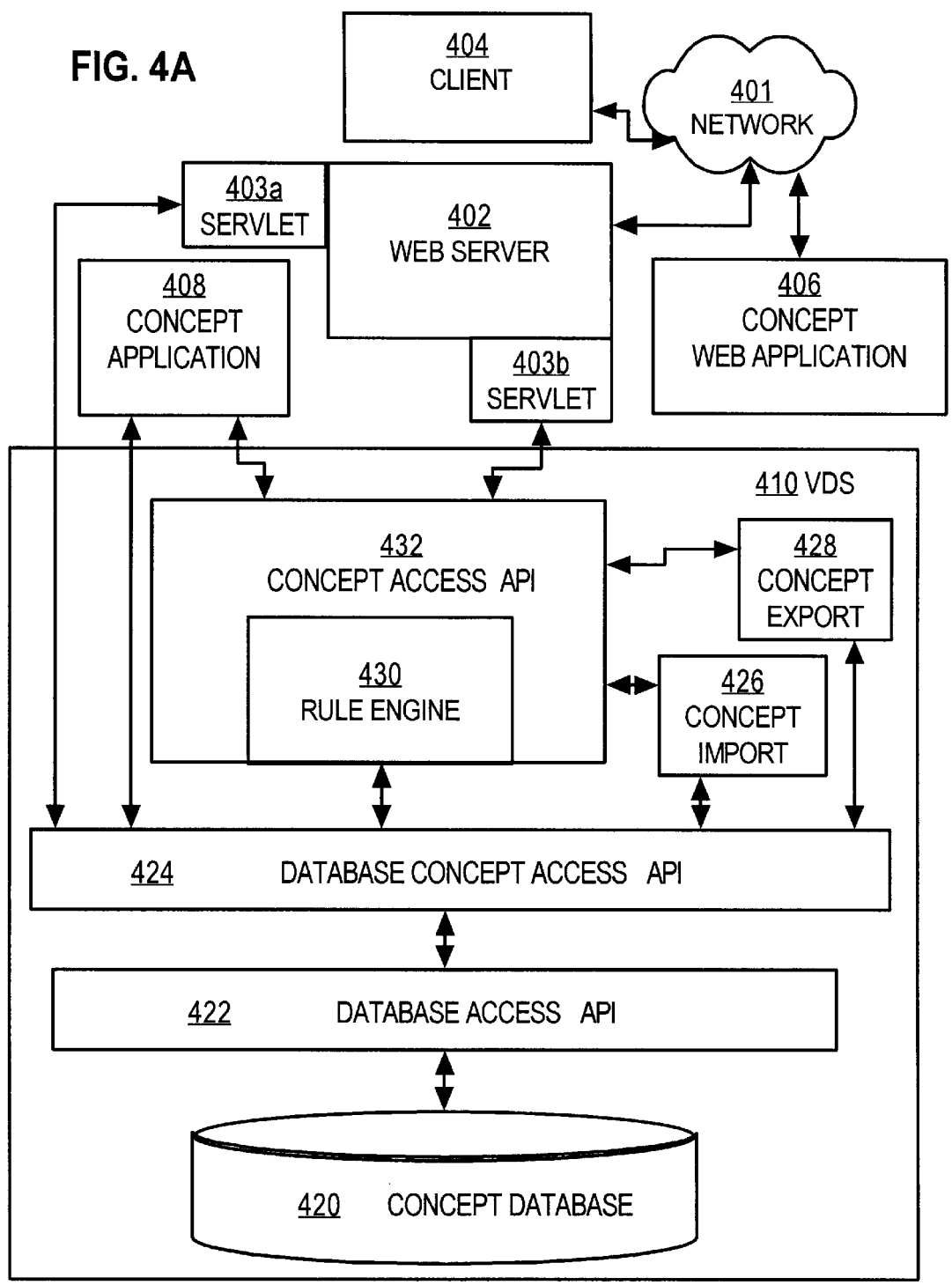
FIG. 4A is a block diagram illustrating a vocabulary development server and external applications.

FIG. 4A is a block diagram showing the architecture of the VDS 410 and its relationship to some external processes. The VDS Concept database 420 is described above. A database access API 422 provides processes to operate on the database rows and tables based on knowledge of the database schema. These processes include connecting to the database, starting a transaction, such as adding, deleting or modifying a row in a table, committing the change in the row to the persistent storage, aborting a transaction, and disconnecting from the database. The database access API 422 also provides processes for adding, deleting, and modifying a raw term in the raw term table.

A database concept access API 424 provides processes for manipulating concepts, relationships and rules in the concept database without requiring knowledge of the actual database schema. For example, processes are included to return all the concepts in a given category, to generate and store a concept category, to add a concept to a category, to return sub-concepts (that is, concepts that are descendent of a given concept), to return child concepts, to return the parent concept of a given concept, to return ancestor concepts, to rename a given concept, to set the parent of a given concept, to delete a concept, and to return duplicate mapping. The database concept access API 424 also includes processes for manipulating relationships, such as to return all relationships, to return all relationship types, to return all "Is_A" relationships, to return all relationships of a given type, to generate and store a relationship type, to generate and store a relationship, to modify a participant or participant type in a relationship type, to modify a participant instance in a relationship instance and to delete a relationship. The database concept access API 424 includes processes for manipulating attributes, such as to return attribute information for all concepts in a given category, to set attribute information, to update attribute information, and to delete attribute information. The database concept access API 424 includes processes for manipulating rules, such as to return all rules in the rule table, to return all rules with a given name, to set the definition of a rule with a given name and sequence number, to generate and store a new rule with a given name and definition, to delete a given rule, and to delete rules with a given name.

The VDS database concept access API 424 is used by applications that are external to the VDS 410, such as concept application 408, and servlet 403a of Web Server 402. The VDS database concept access API 424 is also used by other processes within VDS 410, such as the concept import module 426 and the concept export module 428, and the rule engine 430 of the concept access API 432. All elements of FIG. 4A that are shown outside of VDS 410 are shown by way of example, and are not required. Further, the structural elements of VDS 410 are shown as examples and the specific architecture shown is not required.

The concept import module 426 is designed for the bulk import of a large amount of data, splitting that data into concepts, and storing the concepts in the concept database 420. The concept export module 428 is designed for the bulk export of a large number of related concepts and concept attributes to an external system, such as concept application 408, and client 404 or concept web application 406 through the web server 402 via servlet 403b.

The concept access API 432 provides processes for use by other applications that deal with groups of related concepts, or for responding to queries about concepts, relationships and rules that are received from external application programs. The API is used, for example, by the concept application 408 and servlet 403b of Web server 402 which are technically client processes of the VDS. Through network 401 and the Web server 402, a standalone client 404 such as a Web browser or a concept Web application 406 obtains and uses concept data. These are technically client processes of the Web server 402.

The concept access API 432 groups related concepts based on the requests made by the client processes. The concept definitions and relationships are checked to determine that constraints are not violated. Rules that are employed to define the computations or constraints employed by the concepts and relationships are obtained from the concept database 420 through the database concept access API 424, are converted to executable statements, and are executed by the rule engine 430 of the concept access API 432.

In one embodiment, the rule engine 430 is integrated with the concept access API 432 through the use of a foreign function facility of the PROLOG™ rule engine. This component provides service functions that enable the rule engine to access information, including rules expressed in text of a high level language, from the concept database 420 through the database concept access API 424. Rule execution functions can execute in the rule engine 430 the rules retrieved from the database 420. These functions marshal the function arguments (such as concepts/relationships/attribute) into the rule arguments, execute the PROLOG™ rule and retrieve any results, and un-marshal the rule results into a results set suitable for returning back to the client process, e.g., the calling application.

In this arrangement the concept database can be continually updated with new concepts, new hierarchies, new levels in old hierarchies, new relationships between hierarchies, and new rules, without requiring changes in the applications such as concept application 408, Web server 402, standalone client 404, or concept Web application 406. Any changes dictated by changes in the database 420 can be accommodated by changes in one or more of the APIs of the VDS, such as database access API 422, database concept access API, and concept access API 432.

4.2 Object Oriented Concept Access API

In preferred embodiments, the concept access API 432 is an object oriented software system that supports the creation, storage and update of persistent vocabulary data for retrieval by the external applications using standard Internet protocols. In object oriented software systems various items are treated as objects having object attributes and methods. For example, a particular concept is treated as an object and the attributes of the concept become attributes of the object. Similarly a particular relationship is treated as an object.

The object includes methods, such as a method to list the object attributes, and a method to change an object attribute. Each object is generated as needed as an instance of a class, sometimes called instantiated as needed. Attributes and methods of the class become common to all objects generated from the class at the time the object is instantiated. Some classes called sub-classes are instantiated from other classes called super-classes or parent classes. A class that is made up entirely of methods is sometimes called an interface. A class or object inherits all the attributes and methods of the class from which the class or object was instantiated. A new subclass can extend the super-class it came from by adding or overwriting the attributes and methods of its super-class. Object oriented development systems often provide a large number of classes and subclasses to perform common programming functions and usually provide a user interface to make simple the definition of further subclasses. Each object and class in an object oriented system is usually referenced by a name that has to be unique within a collection of classes and objects called a namespace for the system.

In these embodiments of the concept access API 432, concept types and relationship types are treated as classes and particular concepts and relationships are treated as objects.

4.3 Web Compatible Concept Access API

In some of the embodiments using Internet protocols, documents in the extensible markup language (XML) are used to exchange data between client applications and the concept access API 432 of the VDS server 410. These embodiments support a Web server 402 acting as a client application.

The World Wide Web (the Web) involves a network of servers on the Internet, each of which is associated with one or more Hypertext Markup Language (HTML) pages. However, the same protocols may be used even when the network does not involve the Internet. The HTML pages associated with a server provide information and hypertext links to other documents on that or other servers. Servers communicate with clients by using the Hypertext Transfer Protocol (HTTP). Users of the World Wide Web use a client program, referred to as a browser, to request, decode and display information from servers. When the user of a browser selects a link on an HTML page, the browser that is displaying the page sends a request over the Internet to the server associated with the Universal Resource Locator (URL) specified in the link. In response to the request, the server transmits the requested information to the browser that issued the request. The browser receives the information, presents the received information to the user, and awaits the next user request.

The HTML standard is one application of a more general markup language standard called the Standard Generalized Markup Language (SGML). Recently, a subset of SGML that is more powerful and flexible than HTML has been defined and has gained popularity for providing information on the Internet. The new standard, developed and promoted by the World Wide Web Consortium (W3C), is called the Extensible Markup Language (XML). XML provides a common syntax for expressing structure in data. Structured data refers to data that is tagged for its content, meaning, classification, or use. XML provides an expansion of the tagging that is done in HTML, which focuses on format or presentation. Given the elements defined and used by XML, a document object model (DOM) is used to define how to access the information in the XML documents. Using the DOM, programmers can script dynamic content to cause a specific piece of content to behave in certain way. For example, a piece of text may change color when a user positions a cursor over the text.

Elements are defined for an XML document using Extensible Markup Language (XML) grammar, represented by a document type definition (DTD) or XML schema. A DTD is a set of syntax rules for elements in SGML and XML documents. An HTML tag is a particular kind of SGML element. The DTD tells what elements can be used in a document, what order they should appear in, which elements can appear inside other elements, which elements have attributes, and what those attributes are. A DTD can be part of an XML document, but it is usually a separate document or series of documents. XML allows documents to contain elements from several distinct DTD files by the use of namespaces. In particular, elements from other, independently created DTD files can be interleaved in one XML document.

In these embodiments, a DTD file named "vdf.dtd" is used to define elements comprising concepts, normative concepts, alternative concepts, flat lists of concepts, categories, attributes, and relationships.

4.4 Remote Clients

According to some embodiments, a concept Web application 406 is developed for a remote platform that interacts with the concept access API 432 through a network 401 and a Web server 402. This concept Web application 406 is a remote concept client of the Web server 402a that uses the local concept database 420. It is more than a browser such as is included in the standalone client 404 in that the concept client requests and uses information in the concept database 420 while the browser just requests information provided by the Web server and is uninvolved with where the information originated.

Each concept Web application 406 is allowed to have its own approach to collecting concept data from the VDS 410. Some of these approaches are expected to require fine-grained data manipulation, such as walking hierarchical trees of concepts and relationships. Unfortunately, a performance bottleneck can occur if the fine-grained data manipulation was implemented in the concept Web application 406. Such a fine-grained data manipulation results in numerous round-trip communications between a concept client, such as concept Web application 406, and the Web server 402 interacting with the concept access API 432.

In addition, because the concept access API 432 exchanges data using XML documents, the concept client, such as concept Web application 406, must generate an XML document to send requests to the Web server 402 destined for the concept access API 432 and to process responses from the Web server 402 originating in the concept access API 432. This is true even for clients that are not remote.

Figure 4B:
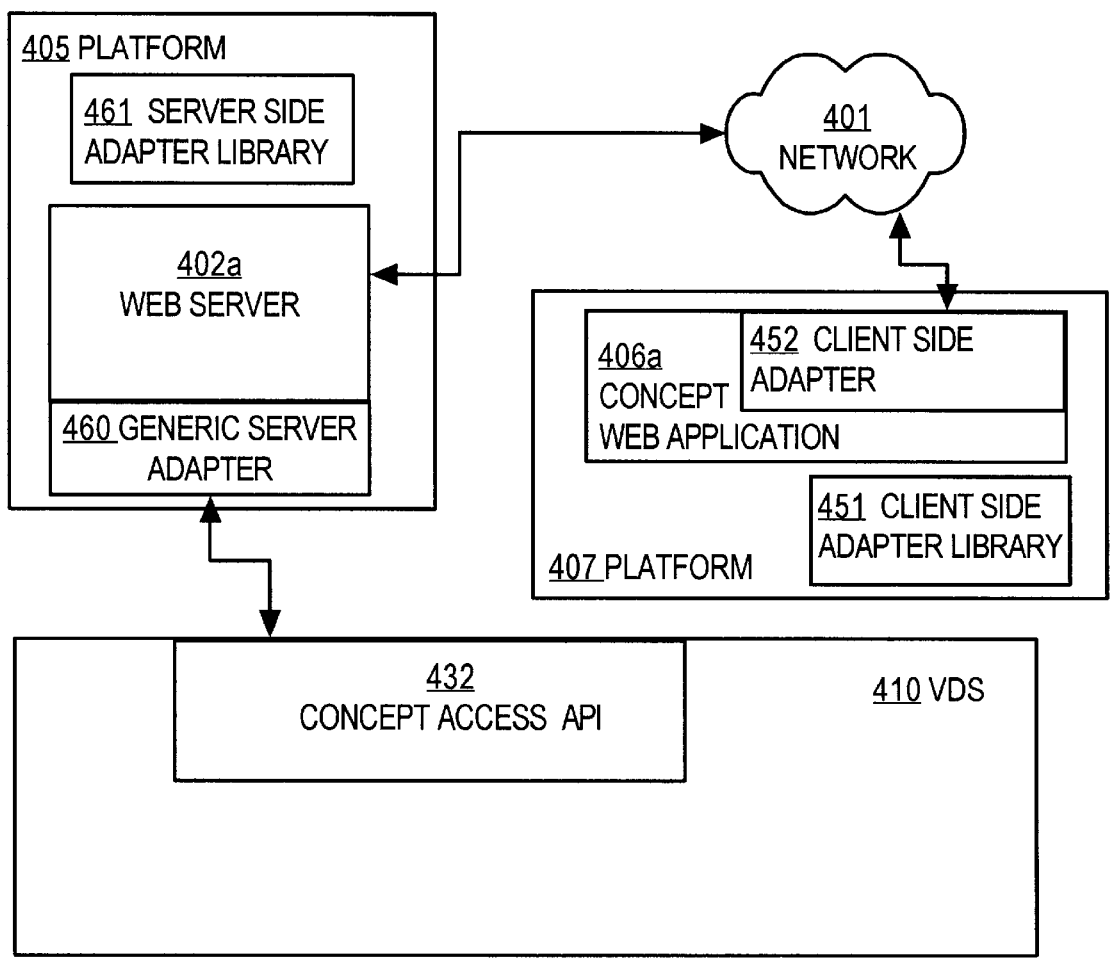
FIG. 4B is a block diagram showing structures on the platforms of applications involved with remote clients.

According to one embodiment, an adapter library is provided as a toolkit to insulate concept client processes from the complexity of XML processing and to eliminate the performance bottleneck caused by fine-grained data manipulation on the client side, such as in walking hierarchical trees. FIG. 4B is a block diagram showing structures on the platforms of applications involved with remote clients using Internet protocols according to this embodiment.

An embodiment 402a of Web server 402 executes on a platform 405 local to the VDS 410 including the concept database 420. A server side adapter library 461 of methods is used to develop a server side adapter, such as generic server adapter 460 for Web server 402a. In the embodiment depicted, the server side adapter library 461 resides on the local platform 405. Alternatively, the toolkit of the server side adapter library 461 resides on a separate platform where a generic server adapter 460 is developed. After development, the server side adapter library 461 is not required for the operation of the generic server adapter 460.

A server side adapter that is created using the server side adapter library 461 is responsible for servicing requests from a concept client process, and collecting the requested concept data returned from the VDS 410 to the concept access API 432 for transport back to the concept client process. The server side adapter acts as an agent on the server platform 405 to collect data on behalf of the concept client. The server side adapter processes the concept data for the concept client process on a local platform 405 that minimizes the expenditure of system time and bandwidth. When the processing is completed, resulting concept data is transmitted back to the concept client process in a single message.

The generic server adapter 460 is implemented as a servlet for Web server 402a. Servlets are software modules that expand a server by providing functionality that is launched in response to a request. Servlets are uniquely identified by a URL and can be invoked and called by invoking the URL. Thus, in this embodiment, the generic server adapter 461 is invoked by sending messages to the URL address of the generic server adapter 460. The generic server adapter 460 passes requests to the concept access API 432 for processing by the VDS 410. The generic server adapter 460 retrieves the responses from the VDS 410 through the concept access API 432, which provides an XML document. The collected responses are passed back to the concept client, such as concept Web application 406a.

On a logically remote platform 407 is a client side adapter library 451 for building a concept client, such as Web application 406a, including a client side adapter 452. In the embodiment depicted, the client side adapter library 451 resides on the remote platform 407. Alternatively, the client side adapter library 451 resides on a platform where the client side adapter 452 is developed. After development, the client side adapter library 451 is not required for the operation of the client side adapter 452.

The client side adapter 452 is responsible for communications with the server adapter, such as generic server adapter 460. In order to process a request from the concept client process, the client side adapter 452 and codes the request into an XML document and communicates the document to the server side adapter, such as generic server adapter 460. In return, the client side adapter 452 receives the XML document including the concept data resulting from the responses from the concept access API 432. The client side adapter 452 presents the concept data to the concept client process, such as concept Web application 406a, in a form required by the concept client process. In this embodiment, the client side adapter 452 includes an XML parser to decode the content of the message returned from the server side adapter, such as generic server adapter 460. In another embodiment, in which the messages are not encoded in XML, the client side adapter 452 need not include an XML parser.

The client side adapter library 451 includes methods to insulate concept client processes from the complexity of XML processing. These methods encapsulate a concept client's requests for concept data, such as business vocabulary data, without exposing the concept client process to XML request syntax. These methods also provide concept data resulting from the requests to the concept client process without exposing the concept client process to XML response syntax parsing.

The client side adapter library 451 includes methods that essentially aggregate multiple requests necessary to navigate hierarchical trees in the concept database 420 into a single message. This reduces the message traffic over the network 401 between the concept client process on the remote platform 407 and the Web server 402a on platform 405 local to the VDS 410. For example, the client side adapter library 451 includes methods to start a document of aggregated requests, to insert each request into the document, and to finish the document and send it to the server side adapter.

5.0 Method grained of Translating Requests for Vocabulary Data

Figure 5A:
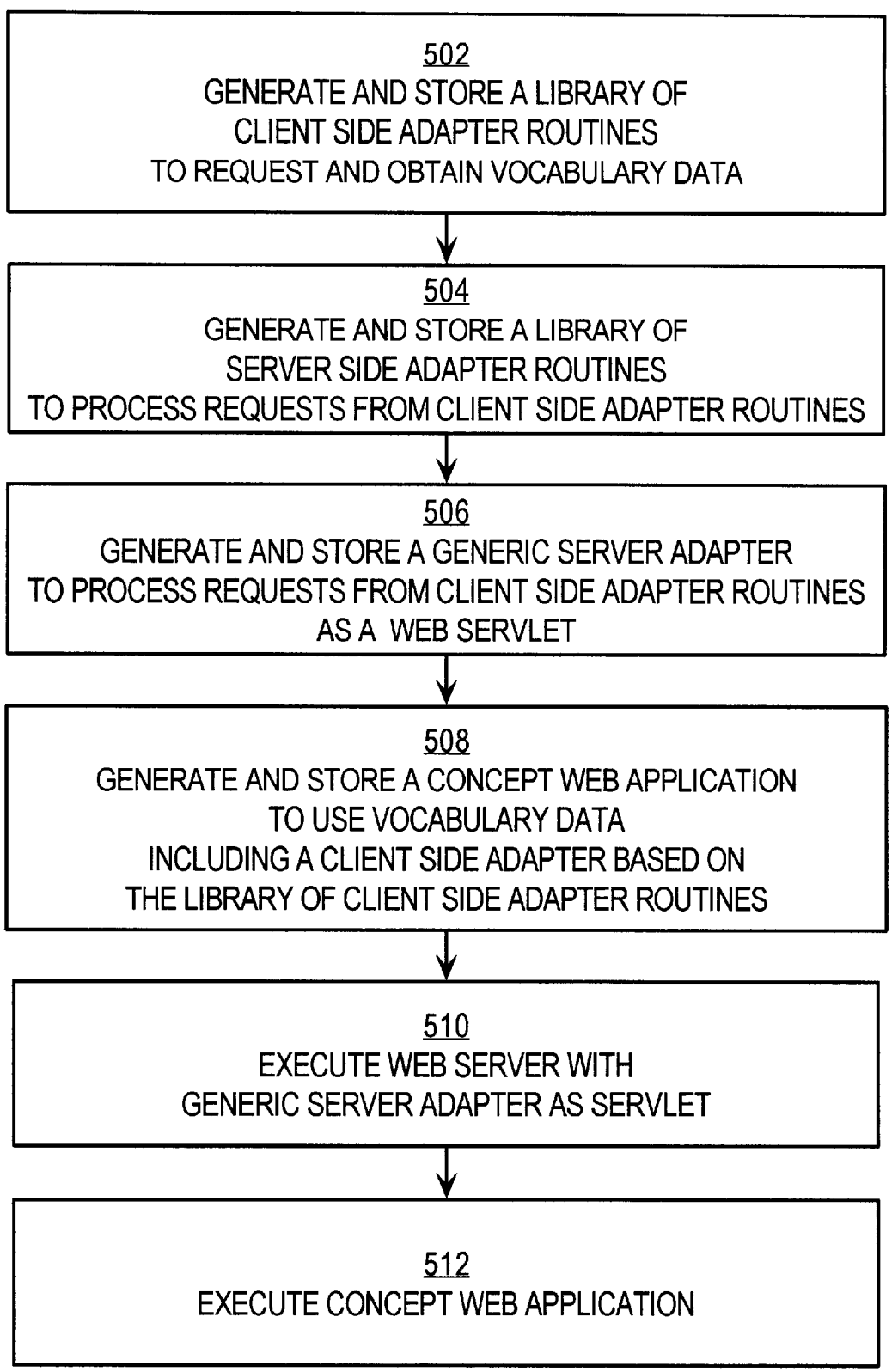
FIG. 5A is a flow chart illustrating a high level method for developing a concept. client.

FIG. 5A is a flow chart illustrating one embodiment of a high level method for developing a concept client that interacts with a concept server. For example, the process of FIG. 5A may be used to develop Web concept application 406a of FIG. 4B, which interacts with Web server 402a of FIG. 4B.

In step 502, a library of client side adapter routines to request and obtain vocabulary data is generated or used and stored. The client side adapter library includes methods for communications with the server side adapter, such as generic server adapter 460. The client side adapter library 451 includes methods to insulate concept client processes from the complexity of XML processing. The client side adapter library 451 also includes methods that essentially aggregate multiple requests necessary to navigate hierarchical trees in the concept database 420 into a single message.

In one embodiment, the client side adapter library comprises object-oriented classes and interfaces. The classes include a request class and request type subclasses for defining request objects. The request types include requests for a concept tree of related concepts, requests for related concepts, request for a concept, and requests for normative terms. The interfaces include methods for starting an export document that aggregate requests, inserting a request into the export document, and finishing the export document. Interfaces also include a method for importing a document comprising the results of the requests previously sent in an export package or data structure, and a method for generating an event based on the request or data encoded in the package or data structure that is imported. The event is chosen from a set of predetermined events. The interfaces also include default methods for responding to each event generated among the set of predetermined events. More information on the classes and interfaces of the client side adapter library are provided elsewhere herein.

In step 504, a library of server side adapter routines is generated and stored. The server side adapter library includes methods for servicing a request from a concept client process, and collecting the concept data resulting from the responses of the concept access API 32, and transporting those collected responses back to the concept client process.

In one embodiment, the client side adapter library comprises object-oriented classes and interfaces. The classes include classes defined for the object-oriented concept access API (432 in FIG. 4B) such as a root concept class (a concept type class) for instantiating concepts, a relationship type class for instantiating relationships, and an attribute class, as well as classes for requests, responses, and sessions. The interfaces include the concept access API (432 in FIG. 4B). A session class provides methods and attributes for managing a connection between a concept client process and the local concept server process. The session class includes methods for starting a transaction with the concept database, for rolling back a transaction with the concept database and for committing a transaction with the concept database.

In step 506, a server side adapter, such as the generic server adapter, is generated and stored as a server-side software component to process requests on the concept client process. An example of such a server-side software component is a servlet. The generic server adapter is designed to process every request generated by any method in the client side adapter library and any XML document produced in those methods. Thus, the servlet with the generic server adapter is the only servlet needed by the Web server to deal with any client process developed with the client side adapter library; and, the URL of this servlet can be included in the client side adapter library method that establishes communications with the VDS.

In step 508, a concept client software program is generated and stored to use the concept data in the concept database 420. The concept client software program includes a client side adapter based on the client side adapter library. Alternatively, a client may obtain access to vocabulary without using an adapter. Further, in another alternative, a non-client external element may obtain vocabulary information using a non-client call or API.

In step 510, the concept server, such as the Web server with the generic server adapter servlet, is executed. More details on the steps performed by the concept server are described in later section.

In step 512, the concept client, such as the concept Web application, is executed. More details on the steps performed by the concept client are described in the next section.

5.1 The Concept Client Process

Figure 5B:
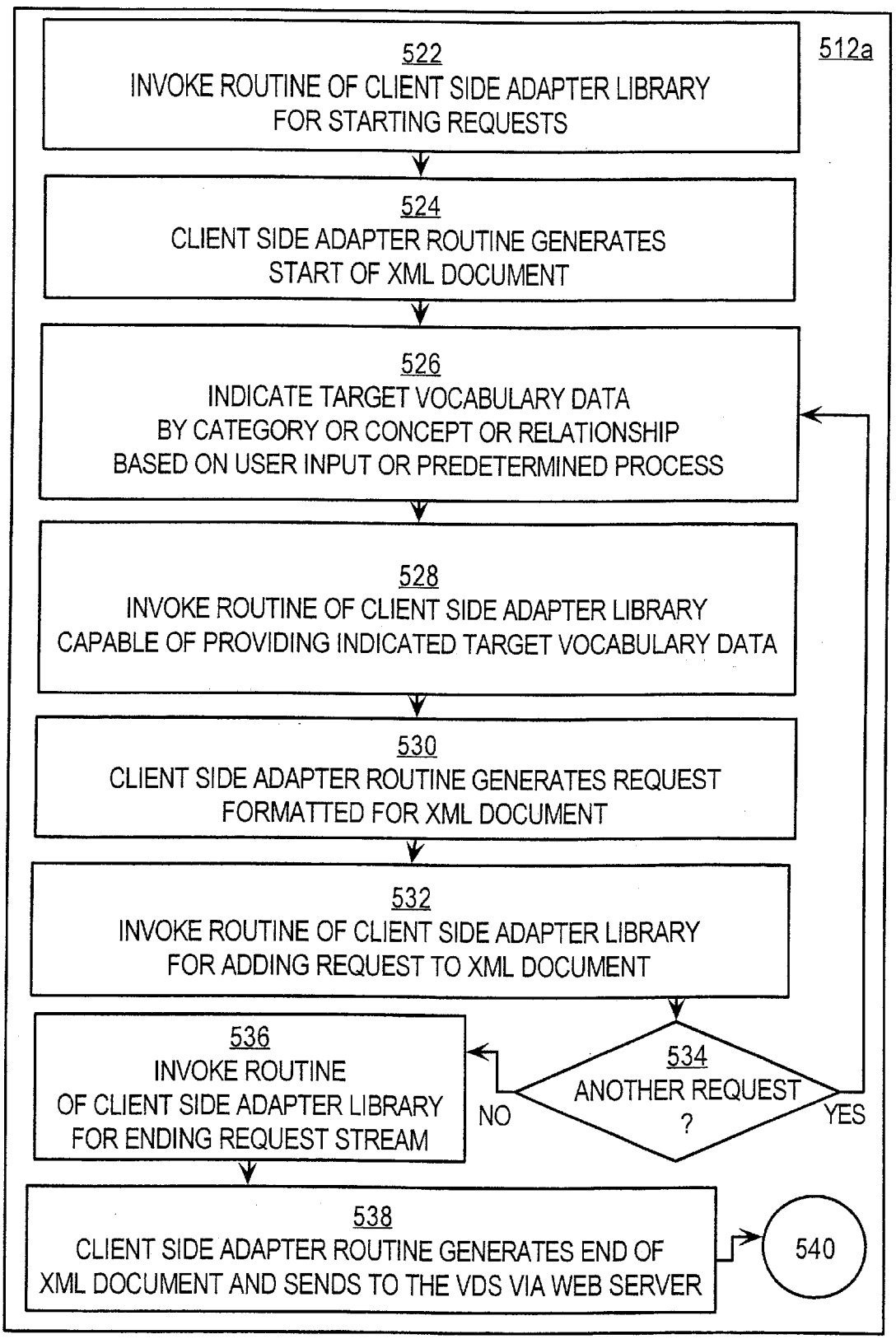
FIG. 5B is a portion of a flow chart illustrating details for executing a concept client process.
Figure 5C:
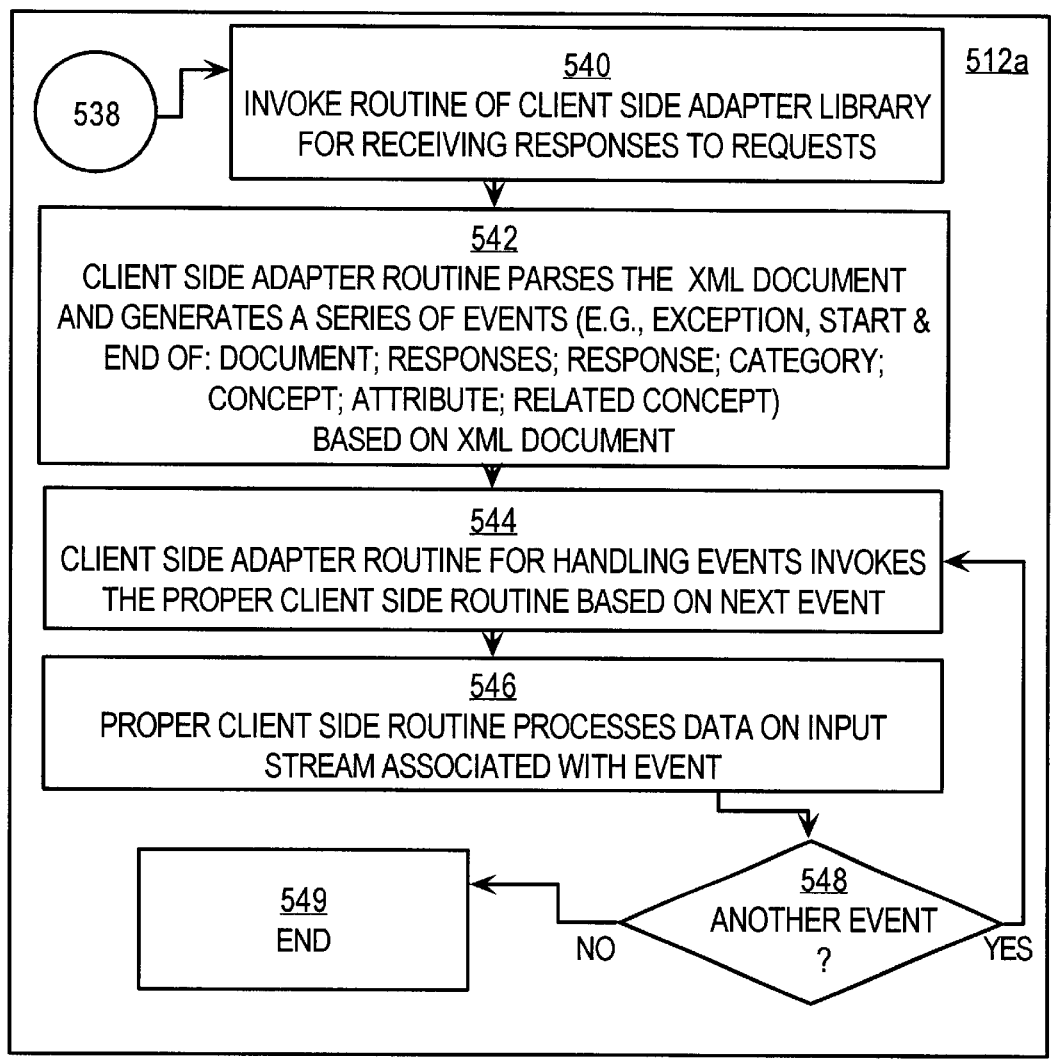
FIG. 5C is a portion of a flow chart illustrating details for executing a concept client process.

FIG. 5B and FIG. 5C are portions of a flow chart illustrating steps performed while executing a remote concept client process according to an embodiment 512*a* of step 512 from FIG. 5A. The same steps can be used by a client process that is not remote. Further, the process of FIG. 5B and FIG. 5C can execute independently of the process of FIG. 5A at any time after steps 502 to 510 are complete.

5.1.1 Requests in an Export Document

In step 522, a method or routine of the client side adapter library is invoked for starting the export document of aggregated requests. In an object-oriented embodiment, this method is placed in an interface named, for example, "MDFXMLClientIF" of the client side adapter library during step 502 and implemented in a class named, for example, "MDFXMLClient Impl," by a developer of the remote concept client process during step 508. In this embodiment, the method is invoked with a method call of the form startXMLexport (outputstream out).

This method is called first to establish the head of the XML document on the output stream. The program that invokes this method need not specify any of the properties of the export XML document being generated, such as the DTD.

In step 524, an output stream (e.g., named "out") is initialized with the start of the XML output for the export document. Typically, the start of the XML document identifies XML as the markup language and specifies a DTD file that defines the document elements to be used. The address of the DTD is inserted into the XML document by the method of the client side adapter library, such as startXMLexport. The DTD itself may reside on the platform 405 of the concept server process or on the platform of the VDS. In this case, the address of the DTD may be expressed as a relative address with respect to the concept server. Otherwise the URL address of the DTD file is inserted into the XML document. During this step, other information useful to the concept server is inserted using the tags defined in the DTD. For example, the version of the client side adapter library being used is inserted into the XML document at this step.

In step 526, the concept client process indicates the target concept or group of concepts being requested. For example, a target concept can be indicated by having a certain attribute or relationship to another concept. The target concept can be indicated through user input to the concept client process or through predetermined steps formulated by the developer of the concept client process.

For example, the concept client process may perform the predetermined step of requesting the root concepts in the concept database, presenting the root concepts to a user of the concept client process as a list of selectable items, and then determine which root concepts were selected by the user. The concept client process may then perform the predetermined steps of requesting for the selected concepts the concepts and alternative terms for the next level in each category and a list of the marketing documents that include information about each concept in that next level.

In step 528, the concept client process invokes methods of the client side adapter library that are capable of providing the indicated target concepts. In the object-oriented embodiment, for example, these methods are placed in a class named "MDFXMLRequest" of the client side adapter library during step 502. Methods of the same method name may be distinguished by the types of parameters supplied when invoked. Table 13 lists some example request methods in the request class of this embodiment.

TABLE 13

Methods in the Request Class of an Example Client Side Adapter Library

| Method Name & Function | Passed Parameters Types | Passed Parameters Meanings |
|---|---|---|
| requestConceptTree For given category name, return normative concepts in tree form | string Boolean (optional)string | category name include alternatives type of alternatives |
| requestConceptTree also return values for attributes named | string Boolean (optional)string string array | category name include alternatives type of alternatives list of attribute names |
| requestConceptTree only return sub-tree starting at given concept named as root for number of levels | string Boolean (optional)string string integer | category name include alternatives type of alternatives concept at root of sub-tree number of levels from root (null indicates all levels) |
| requestConcept For given category name, return normative concepts in flat form | string Boolean (optional)string | category name include alternatives type of alternatives |
| requestConcept restrict returned concepts to those with named relationship types to partners in the corresponding named category | string Boolean (optional)string string array string array | category name include alternatives type of alternatives list of relationship types list of corresp. partner category |
| requestConcept For given normative concept of named category return concepts with named relationship types to partners in the corresponding named category | string string Boolean (optional)string string array string array | category name normative concept name include alternatives type of alternatives list of relationship types list of corresp. partner category |
| requestConcept Supports generic requests for returning concepts and attributes listed for returned concepts, restricted to concepts with given attribute values of certain restricting attributes | string Boolean (optional)string string array string array string array string array | category name include alternatives type of alternatives list of relationship types list of corresp. partner category list of attributes to return list of restricting attributes list of corresp. attribute value for restricting attribute |
| requestNormativeTerms Given a category name, alternative type, and alternative name, return the normative terms having the specified alternative name and type | string string string | category name alternative name alternative type |

Herein, "string" indicates one or more text characters, "Boolean" indicates a logical true or false, and "integer" indicates a whole number in binary code. The result of invoking one of these methods is a request data structure to be inserted into the export document, not the list or tree of target concepts. The request data structure is here indicated by type "MDFXMLRequest." In embodiments that include multiple inter-related hierarchies, other methods are included in the Request class to retrieve multiple relationships for each concept and multiple partners for each non-binary relationship.

For the example concept client process to obtain the root concepts, a method of Table 13 could be invoked as follows MDFXMLRequest FirstRequest =requestConceptTree
("Vocabulary", FALSE, "Vocabulary",1)

This call is made because the root concepts are in a hierarchy with the top level pseudo concept "Vocabulary" and thus would appear one level down in the tree.

In step 530, the request method invoked generates a request type data structure. For the XML export document, the resulting request data structure comprises one or more XML document elements indicated by tags. For example, the XML element generated by the above method takes the following form:

<selectConceptTree category ="Vocabulary"
         normativeName="Vocabulary" levels="2">
</selectConceptTree> where the XML element selectConceptTree is defined in the DTD file to have attributes named "category" "normativeName" and "levels." The first example XML statement associates values with these three attributes of this XML element. The selectConceptTree element has other attributes defined in the DTD but those attributes are not assigned values in the XML statements associated with the example request. The second XML statement indicates the end of this element. These two XML statements are generated by the request method invoked by the concept client process. The concept client invoking the request method need not specify any of the properties of the export XML document being generated. That is, the concept client does not need to specify the XML element name "selectConceptTree" or specify that its attribute names include "category", "normativeName" and "levels." In step 532, the request data structure is added to the export document by invoking another method of the client side adapter library. In the object-oriented embodiment, as described above with respect to step 522, for example, this method is placed in the interface named "MDFXMLClientIF" of the client side adapter library during step 502 and implemented by the class "MDFXMLClient Impl" by a developer of the remote concept client process during step 508. In this embodiment, the method is invoked with a statement of the form request(MDFXMLRequest FirstRequest).

This method is called to place the request into the export document. In some embodiments this method also translates the data structure into a different format. For example from a non XML data structure into XML elements. In the XML embodiment, however, the data structure is already represented by the XML elements given above, and this method simply appends those XML elements given above to the elements already in the export XML document. For example, the method inserts a "request" element, <request>, into the XML document, then inserts the XML elements given above specifying the request, then inserts the "end of request" element, </request>.

In step 534 it is determined whether there is another request to be appended to the XML document. If there is another request, control passes back to step 526 to indicate what concept data is to be requested. If there is no other request, or if there is no other request that can be formulated without returning results from the requests already made, then control passes to step 536 to finish the export document and send it.

For the example concept client, which presents the root concepts to a user for selection before requesting further concept data, no other requests are added to the current export document.

In step 536, a method of the client side adapter library is invoked for finishing and sending the export document of aggregated requests. In the object-oriented embodiment, this method was placed in an interface named "MDFXMLClientIF" of the client side adapter library during step 502 and implemented by the class "MDFXMLClient Impl" by a developer of the remote concept client process during step 508. In this embodiment, the method is invoked with a statement of the form finishXMLexport ( ).

In step 538, the invoked method finishes the export document and sends it. For example, the finishXMLexport method (1) places the end of XML document tag "</>" at the end of the document, (2) establishes a communications session with the concept server using the URL address of the concept server such as the servlet comprising the Generic server adapter within the Web server, and (3) sends the XML document over the network to the concept server for processing. Table 14 shows the XML statements in an example export document according to this embodiment.

TABLE 14

XML statements in a hypothetical request (export) document.

| line # | XML statement |
|---|---|
| 1 | <?xml version="1.0"?> |
| 2 | <!DOCTYPE requests SYSTEM "vdf.dtd"> |
| 3 | <request> |
| 4 |    <selectConceptTree category="Vocabulary" normativeName="Vocabulary" levels="2"> |
| 5 |    </selectConceptTree> |
| 6 | <request> |
| 7 | </> | control then passes to step 540 to import a response from the concept server.

5.1.2 Responses in an Import Document

In step 540 of FIG. 5C, the concept client process invokes a method of the client side adapter library for receiving in an import document one or more responses to the one or more requests sent in the export document. In the object-oriented embodiment, this method was placed in an interface named "MDFXMLClientIF" of the client side adapter library during step 502 and implemented by the class "MDFXMLClient Impl" by a developer of the remote concept client process during step 508. In this embodiment, the method is invoked with a statement of the form importXML (inputstream in, MDFXMLClientEventIF handler).

In step 542, the invoked method extracts values associated with related concepts, such as concept names, relationships, and attributes, from the import document. In some embodiments the method also translates from a particular import document format.

For example, method importXML (1) parses the import XML document on the input stream "in" to determine the individual elements in each response, and (2) converts those elements into a number of predetermined events. The programmer invoking this method writes code to handle the predetermined events but does not specify the properties of the import XML document being returned. In one embodiment, the method importXML invokes methods implemented from third party interfaces for parsing XML documents based on the associated DTD fields.

In step 544, the events generated are sent to an event handler named "handler," which is an instance of an interface called "MDFXMLClientEventIF" generated and placed in the client side adapter library during step 502 and implemented by the class "MDFXMLClientEventImpl" by a developer of the remote concept client process during step 508. The interface in the client side adapter library contains names and parameters of the methods called upon occurrence of the predetermined events, as given by Table 15, but simply returns with default values when called. When implemented by the concept client programmer, during step 508, code is inserted to perform any particular processing desired by the programmer upon the occurrence of one of the predetermined events.

TABLE 15

Methods Called Upon Occurrence of Predetermined Events

| Event | Method Name & Function | Types & | Meanings of Passed Parameters |
|---|---|---|---|
| import document starts | importStart Called when parsing of the current import document begins | string | current version of client side adapter |
| import document ends | importEnd Called when parsing of the current import document ends. | | |
| responses start | responsesStart Called when parsing the first of the responses aggregated in the current document starts | long integer | time stamp indicating when concept server started generating responses |
| responses end | responsesEnd Called when all the responses aggregated in the current document have been parsed | | |
| response starts | responseStart Called when the parsing of a next one of the aggregated responses starts | | |
| response ends | responseEnd Called when the parsing of the current one of the aggregated responses ends | | |
| category starts | conceptCategoryStart Called when parsing a next category of concepts in the current response starts | string | name of the category being parsed |
| category ends | conceptCategoryEnd Called when parsing of the current category of concepts ends | | |
| normative concept starts | normativeTermStart Called when parsing of the next normative concept in the current category starts | string integer integer integer | norm. concept name norm. concept ID level in category parent concept ID |
| normative concept ends | normativeTermEnd Called when parsing of the current normative concept ends | | |
| child concepts start | childTermsStart Called when parsing the next level of children in the sub-tree below the normative concept starts | | |
| child concepts end | childTermsEnd Called when parsing the current level of children ends | | |
| alternative concepts start | alternativeTermsStart Called when parsing the alternative concepts associated with the current normative concept starts | | |

TABLE 15-continued

Methods Called Upon Occurrence of Predetermined Events

| Event | Method Name & Function | Types & | Meanings of Passed Parameters |
|---|---|---|---|
| alternative concepts end | alternativeTermsEnd Called when parsing the alternative concepts of the current normative concept ends | | |
| alternative concept starts | alternativeTermStart Called when parsing a current alternative concept starts | string integer | alternative type alternative concept ID |
| alternative concept ends | alternativeTermEnd Called when parsing the current alternative concept ends | string | alternative concept name |
| related concepts start | relatedConceptsStart Called when parsing the related concepts associated with the current normative concept starts | | |
| related concepts end | relatedConceptsEnd Called when parsing the related concepts of the current normative concept ends | | |
| related concept starts | relatedConceptStart Called when parsing a current related concept starts | string string string | relationship type category of partner related concept ID |
| related concept ends | relatedConceptEnd Called when parsing the current related concept ends | string | normative name of related concept |
| attribute starts | attributeStart Called when parsing a next attribute of a current concept starts | string string | name of next attribute type of current attribute |
| attribute ends | attributeEnd Called when parsing the current attribute ends | string | value of the current attribute |
| requests fail | exception Called to indicate that the requests in the export document could not all be accomplished. No concepts are returned. | integer string | unique ID for error plain text message indicating the source of the error |

In embodiments that include multiple inter-related hierarchies, other predetermined events and corresponding methods are included in the interface of the client side adapter library to distinguish additional relationships for each concept and multiple partners for each non-binary relationship. In such embodiments the methods and events for related concepts include concepts related by all relationships, including the "category child of" relationship. In this embodiment, then, the conceptCategoryStart, the alternativeTermsStart, and the childTermsStart methods and associated events are special cases of the relatedConceptsStart method and associated event; while the alternativeTermStart and: the childTermStart methods and associated events are special cases of the relatedConceptStart method and its associated event. Similarly, in these embodiment, the conceptCategoryEnd,: the alternativeTermsEnd, and the childTermsEnd methods and associated events are special cases of the relatedConceptsEnd method and associated event; while the alternativeTermEnd and the childTermEnd methods and associated events are special cases of the relatedConceptEnd method and its associated event.

In an example of this embodiment, the request generated by the sample statement given above, namely, request FirstRequest=requestConceptTree("Vocabulary", FALSE, "Vocabulary", 1)

caused an XML element representing the request to be placed in an export document and sent to the concept server. As a consequence, the concept server causes an import document containing one or more responses to be returned to the concept client. In one embodiment, the import document is also in XML and includes the XML statements shown in Table 16. More detail on how the import document is generated by the concept server is given in the next section.

TABLE 16

XML statements in a hypothetical import document.

| line # | XML statement |
|---|---|
| 1 | <?xml version="1.0"?> |
| 2 | <!DOCTYPE responses SYSTEM "vdf.dtd"> |
| 3 | <responses time = "122333444455555666666"> |
| 4 | <response> |
| 5 |    <selectConceptTree> |
| 6 |    </selectConceptTree> |
| 7 |    <conceptCategory> |
| 8 |      <normativeTerm name = "Vocabulary" ID = "11" level= "0" parentID = null> |
| 9 |      </normativeTerm> |
| 10 |      <childTerms> |
| 11 |        <normativeTerm name = "DOC" ID = "1001" level= "1" parentID = "11"> |
| 12 |        </normativeTerm> |
| 13 |        <normativeTerm name = "PROD" ID = "1005" level= "1" parentID = "11"> |
| 14 |        </normativeTerm> |
| 15 |        <normativeTerm name = "SOLU" ID = "1010" level= "1" parentID = "11"> |
| 16 |        </normativeTerm> |
| 17 |        <normativeTerm name = "TECH" ID = "1015" level= "1" parentID = "11"> |
| 18 |        </normativeTerm> |
| 19 |        <normativeTerm name = "USER" ID = "1020" level= "1" parentID = "11"> |
| 20 |        </normativeTerm> |
| 21 |      </childTerms> |
| 22 |    </conceptCategory> |
| 23 | </response> |
| 24 | </responses> |
| 25 | </> |

In this embodiment, the XML statements of Table 16 will cause the predetermined events to occur in the order shown in Table 17.

TABLE 17

Sequence of events generated from hypothetical import document

| Event | called method with parameter values |
|---|---|
| 1 import document starts | importStart("1.0") |
| 2 responses start | responsesStart(122333444455555666666) |
| 3 response starts | responseStart( ) |
| 4 category starts | conceptCategoryStart("Vocabulary") |
| 5 normative concept starts | normativeTermStart("Vocabulary",11,0, NULL) |
| 6 normative concept ends | normativeTermEnd( ) |
| 7 child concepts start | childTermsStart( ) |
| 8 normative concept starts | normativeTermStart("DOC",1001,1, 11) |
| 9 normative concept ends | normativeTermEnd( ) |
| 10 normative concept starts | normativeTermStart("PROD",1005,1, 11) |
| 11 normative concept ends | normativeTermEnd( ) |
| 12 normative concept starts | normativeTermStart("SOLU",1010,1, 11) |
| 13 normative concept ends | normativeTermEnd( ) |
| 14 normative concept starts | normativeTermStart("TECH",1015,1, 11) |
| 15 normative concept ends | normativeTermEnd( ) |
| 16 normative concept starts | normativeTermStart("USER",1020,1, 11) |
| 17 normative concept ends | normativeTermEnd( ) |

TABLE 17-continued

Sequence of events generated from hypothetical import document

| Event | called method with parameter values |
|---|---|
| 18 child concepts end | childTermsEnd( ) |
| 19 category ends | conceptCategoryEnd( ) |
| 20 response ends | responseEnd( ) |
| 21 responses end | responsesEnd |
| 22 import document ends | importEnd( ) | programmer of the concept client application provides the processing within each called method in Table 15 but is insulated from having to deal with the XML statements shown in Table 16. The processing programmed into the methods may include storing the data returned to those methods in a general public data structure or sending the data to another method as a set of one or more parameters. In step 546, the event handler associated with the event processes the data passed from the import document.

In step 548 it is determined whether more events are expected. If so control passes to step 544 to invoke the appropriate event handling method. Otherwise, the processing ends in step 544. In the example embodiment, control is passed to step 549 by the method importEnd.

5.1.2 Multiple Requests and Responses

If the concept client has additional requests to make, based on the responses received in the first import document, then control passes back to step 522 to start another export document with new requests. For the example concept client process described above, when the results from the first request are returned and presented to a user to make a selection, the user may select the root concepts "Products" and "Solutions" for obtaining the concepts and alternatives in the next level and to identify the marketing document for those concepts. At that time the concept client process would invoke the methods of Table 13 in the following two requests.

MDFXMLRequest SecondRequest =requestConceptTree ("PROD", TRUE, "PROD", 1)

MDFXMLRequest ThirdRequest =requestConceptTree ("SOLU", TRUE, "SOLU", 1).

These two requests can be made together in the same export document, and steps 522 through 538 repeated.

When these results are later returned, the normative concepts may be placed into an array called NormativeConcepts[] by the normativeTermEnd method. The normative concepts at the next level for the products concept might include NormativeConcept [1] having name "Network Device Products," NormativeConcept[2] having name "Network Software Products," and NormativeConcept [3] having name "Cabling Products." The normative concepts at the next level for solutions concept may include NormativeConcept[4] having name "SingleServerLocal", NormativeConcept[5] having name "WAN-2sites," and NormativeConcept[6] having name "VPN-3to8." At that time the concept client process would invoke the methods of Table 13 such as in the following statements.

```
startXMLexport (outputstream out).
Array1[1] = "marketDoc"
Array2[1] = "Document"
loop over i from i=1 to i=6
    MDFXMLRequest TempRequest = requestConcept("Products",
        NormativeConcept[i],FALSE, Array1,Array2)
    request(MDFXMLRequest TempRequest).
end loop
finishXMLexport ( ).
```

These statements ask for the concepts of type "Document" that are related by the relationship type "marketDoc" to the concepts stored in the NormativeConcepts string array. This example combines six requests in a single export document. The concept results returned from these statements would include the name or URL of marketing documents for products such as devices, software and cabling sold by the enterprise and for single server local networks, wide area networks of two sits, and virtual private networks of 3 to 8 sites. That is, the single import document aggregates many concept results associated with six responses to the six requests.

Altogether, the example concept client generated three export documents and processed three import documents in order to make nine requests (one request in the first export document, two requests in the second export document, and six requests in the third export document) and to obtain nine responses.

5.2 The Concept Server Process

Figure 5D:
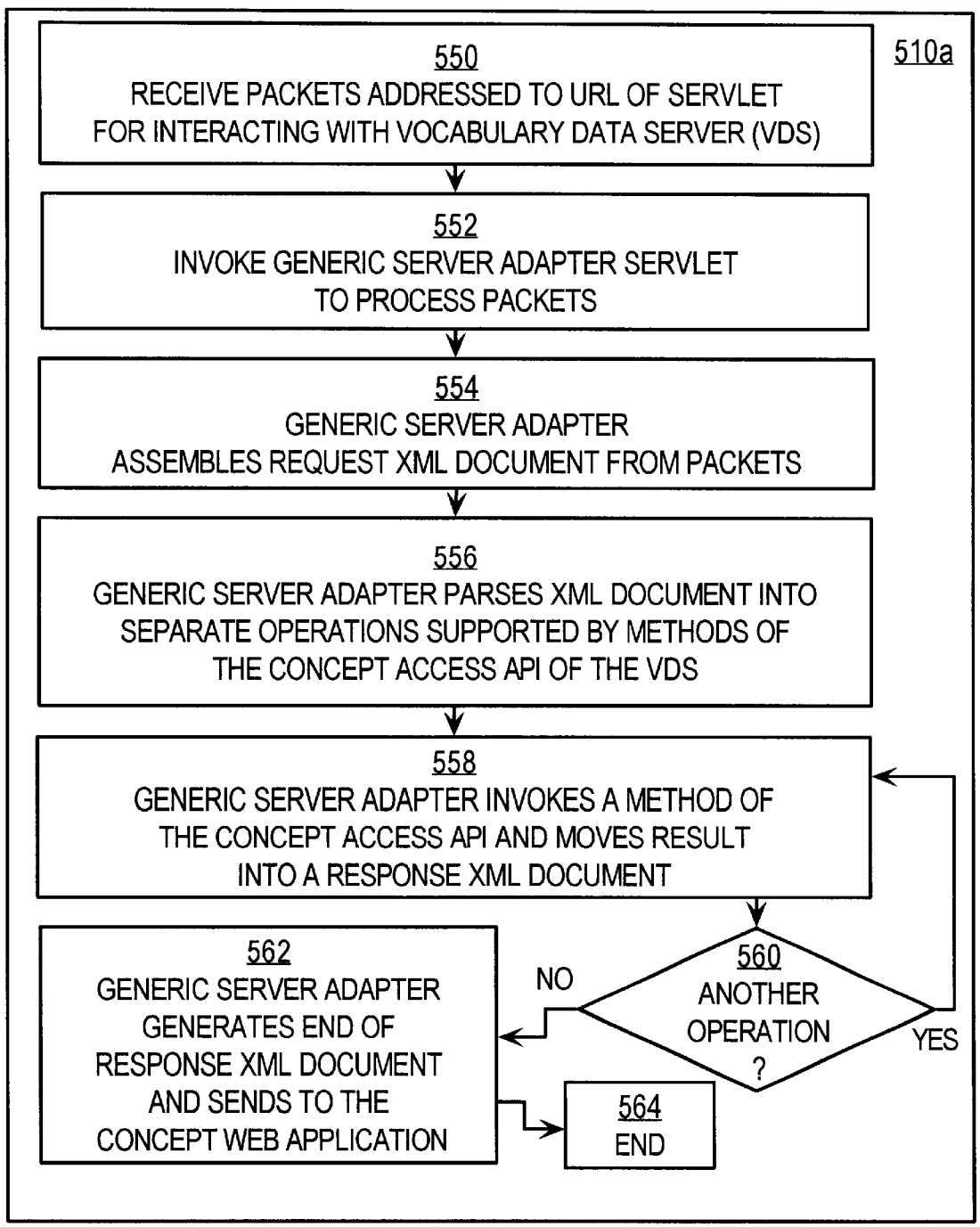
FIG. 5D is a flow chart illustrating details for executing a concept Web server process.

FIG. 5D is a flow chart illustrating details for executing a concept server process external to the VDS system, such as the concept Web server, according to an embodiment 51a of step 510 from FIG. 5A.

In step 550, the concept Web server receives packets addressed to the URL of the servlet implementing the generic server adapter. When the concept server is implemented as a standalone application, rather than as a Web server with servlet, the URL to which the packets are addressed is the URL of the standalone application. In step 552, the concept Web server invokes the servlet to which the packets are addressed. Step 552 is optional where the concept server is implemented as a standalone server application.

In step 554, the packets communicated are assembled into the request document exported by the concept client process as described above with respect to FIGS. 5B and 5C. In the preferred embodiment, the request document is an XML document. Table 14, described above, lists the XML statements in an example XML request document.

In step 556, based on the statements in the request document, the concept server determines a set of operations that are performed by methods available to the concept server. The methods available to the concept server include methods in the server side adapter library, which in one embodiment includes the methods of the concept access API 432 of the VDS 410. For example, the XML document header information in lines1 and 2 of Table 14 may be used by several methods of the concept server, so that the set of operations performed by these header methods are determined to be in the set of operations to be performed on this request document. Those operations include starting a response document to be imported by the concept client process and providing a creation time for the responses to follow.

In the preferred embodiment, step 556 includes determining that the XML element <selectConceptTree>requires one or more operations performed by methods of the concept access API 432 in the server side adapter library 461. For example, in one embodiment the concept server determines that a selectConcepTree XML element with concept normativeName="Vocabulary" and with "levels" =2 corresponds to a concept access API method "selectConceptCategory" without parameters -- a special method for providing the root concepts.

In step 558, the methods that perform the set of operations determined from the request document are invoked and the result is moved into a response document, for import by the concept client. For example, the header methods would be invoked to perform the operations for starting a response document by generating the first statements in the response XML document, such as the first three lines listed in Table 16 for a hypothetical response (import) document. In the preferred embodiment, the generic server adapter invokes the concept access API method "selectConceptCategory" determined to correspond to an element of the XML request document and obtains the result which is expressed as new XML elements.

This step includes aggregating results based on the responses into the response document to be imported in the client process. For example, the XML elements returned by the concept access API method "selectConceptCategory" includes a list of normative terms and attributes. In a hypothetical example, the normative terms are "DOC" for documents, "PROD" for products, "SOLU" for solutions, "TECH" for technologies, and "USER" for users. The concept server inserts into the response document several XML elements based on these results.

For example, as shown in Table 16, the XML element <response>is inserted at line 4 to indicate a response to a request follows in the response document. The particular request is indicated, in this example, by inserting into lines 5 and 6 of the response document the XML elements associated with the start and end of the request type "selectCategoryTrees" found in the request document shown in Table 14. The root concept category for the response is "Vocabulary" so the results are inserted between a start of concept element in line 7 and an end of concept element in line 22 of Table 16. The first result is the normative concept for the category. In this embodiment, the results from the concept access API include names and values of all the attributes of the normative concept for the category. However, only the attributes name, ID, level and parent ID are used by the methods of the concept client for this response. Therefore the concept server pares down the results to values for these four attributes, and inserts these values into an XML element for the response document being prepared for the concept client, as illustrated in Table 16 by line 8. Line 9 is inserted to signal the end of the current normative concept.

The results from the concept access API include a list of the normative concepts of all the root concepts with all their attributes. Information expected by the concept client, corresponding to the requestConceptTree request, is selected from these results and placed into the XML response document between elements marking the start and end of the child concepts (lines 10 and 21, respectively, of Table 16). Between these elements are placed the elements marking the start and end of each normative concept corresponding to each of the categories. The normative concepts are placed into the response XML document with just the attributes that satisfy the request. The additional attributes of these normative concepts yielded by the concept access API are not included. Normative concepts and attributes placed in the hypothetical example response document are shown in Table 16 in lines 11 through 20, inclusive.

Step 560 represents a decision point to determine whether any operations remain to be performed to handle the requests in the current request document. If there is another operation it is performed in step 558. If not, the response document is finished, and control passes to step 562. In step 562, the concept server generates the end of the response document and sends the response document to the concept client over the network. For example, the generic server adapter inserts an "end of document" element, </>, as the last XML element in the response document, as shown in line 25 of Table 16; and then sends the document to the concept client. In step 564, the processing of this set of requests comes to an end.

As illustrated by this example, the concept server invokes methods to perform operations determined from the request document and forms a response document based on the results of invoking those methods. This arrangement allows the concept server to substitute one or more operations for a single request element in the request document and to pare down the amount of data returned in the response document. Both functions serve to insulate the concept client from details of the concept access API and concept database. Both functions further serve to reduce traffic on the network between the concept client and the concept server. The former function reduces the traffic sent from client to server by allowing one request to be replaced by several operations at the server side. The latter function reduces the size of the response document sent back to the client by excluding extra data output by the VDS (that is not needed to fulfill the request) before the response document is sent over the network.

6.0 Hardware Overview

Figure 6:
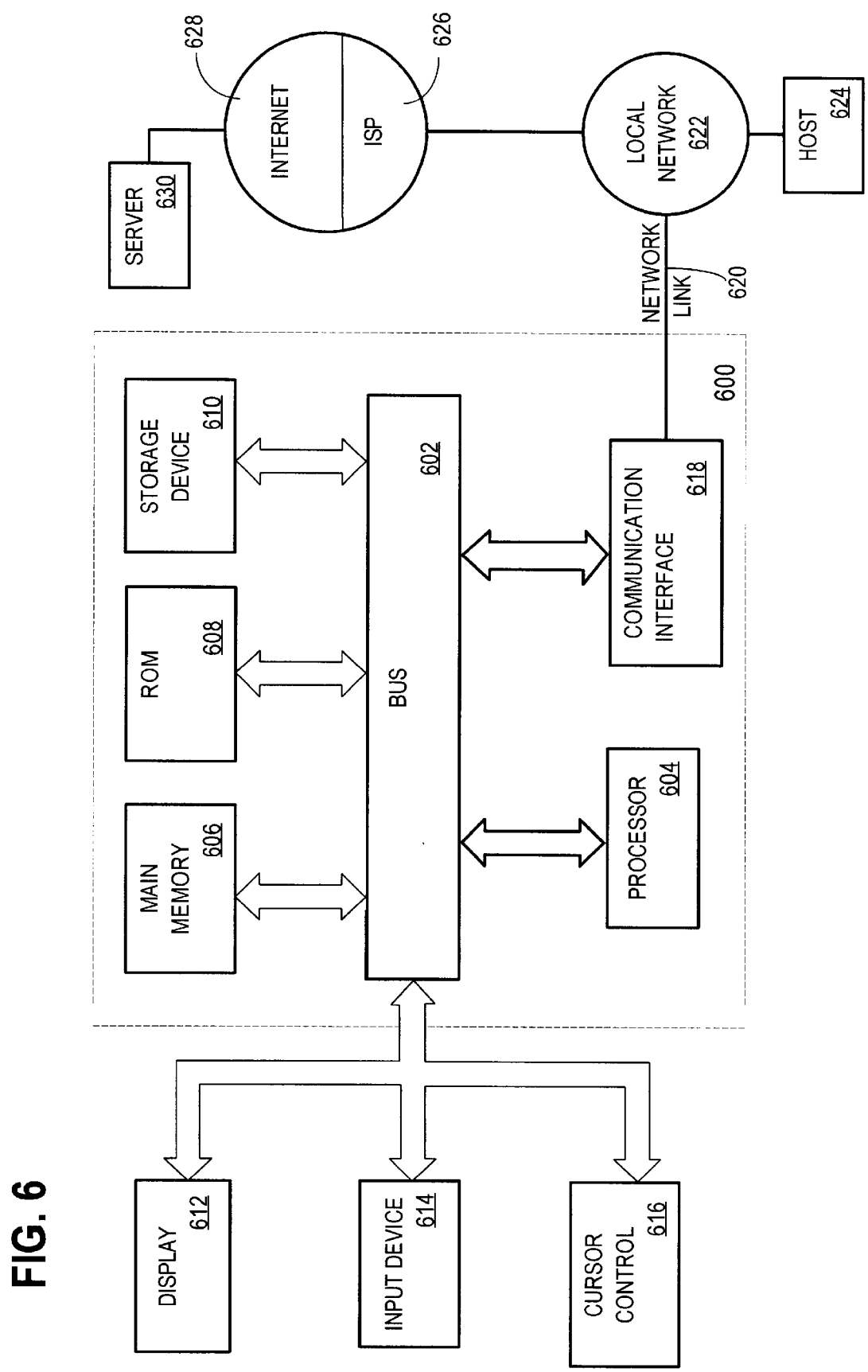
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for accessing a vocabulary development server. According to one embodiment of the invention, a remote concept client process using the vocabulary development server is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN; Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for the client side adapter library through Internet 628, ISP 626, local network 622 and communication interface 618. In accordance with the invention, one such downloaded library provides for a remote concept client process as described herein.

The received code may be executed by processor 604 as it is received, and/or stored in storage device 610, or other non-volatile storage for later execution. In this manner, computer system 600 may obtain application code in the form of a carrier wave.

7.0 Scope

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of translating any of a plurality of queries for related concepts in a database of concepts and relationships among concepts, the database local to a concept server process, a first query originating from a first concept client process, wherein a plurality of other concept client processes may issue other respective queries, the method comprising the steps of:

accepting the first query in a format required by the first concept client process;

translating the first query into one or more concept server request data structures that are expressed using a markup language in a first document, wherein each of the request data structures represents a request for the concept server process to transform the first query into a concept tree, one or more related concepts, or one or more normative terms;

sending the first document to a concept server over a network;

receiving over the network from the concept server a second document in the markup language that includes results based on the concept server process processing the request data structures, wherein the results comprise one or more concept categories, normative terms, alternative terms, or related concepts for the first query; and translating from the markup language in the second document into values of the related concepts in the format required by the first client process.

2. A method as recited in claim 1, wherein:

said step of translating the first query further comprises invoking for each request data structure a method of a client-side adapter library provided by providers of the database of concepts and relationships for remote use of the database; and said invoking the method of the client-side adapter library causes the request data structure to be placed in the first document.

3. A method as recited in claim 2, wherein:
said step of sending the first document further comprises invoking a different method of the client-side adapter library; and
said invoking the different method of the client-side adapter library causes the first document to be finished for sending and to be sent.

4. A method as recited in claim 2, wherein said invoking the method of the client-side adapter library further causes the first document to be started.

5. A method as recited in claim 2, wherein said invoking the method of the client-side adapter library further causes the request data structure to be translated into a predetermined format in the markup language before being placed into the first document.

6. A method as recited in claim 5, wherein:
the first document is an extensible markup language document; and
the predetermined format uses document elements defined in a particular document type definition file developed for remote requests for the database of concepts and relationships.

7. A method as recited in claim 2, wherein the client-side adapter library comprises object-oriented classes for requests for at least two of a concept, a category of concepts, a sub-category of concepts, and a hierarchical tree of concepts.

8. A method as recited in claim 2, wherein the client-side adapter library comprises object-oriented interfaces for starting the first document, inserting a request into the first document, and finishing the first document.

9. A method as recited in claim 1, wherein:
said step of translating the first query further comprises invoking a first method of a client-side adapter library provided by providers of the database of concepts and relationships for remote use of the database; and
said invoking the first method of the client-side adapter library further comprises,
invoking an event handler of the client-side adapter library for handling every event of a plurality of predetermined events, and
converting a plurality of responses in the second document into a series of events, each event of the series of events selected from the plurality of predetermined events.

10. A method as recited in claim 9, wherein the plurality of predetermined events comprise: a start of the second document; an end of the second document; a start of a response; an end of the response; a start of related concepts; an end of the related concepts; a start of a concept; an end of the concept; a start of an attribute; and an end of the attribute.

11. A method as recited in claim 9, wherein:
said invoking the event handler causes a particular method of the concept client process to be invoked in response to a particular event of the plurality of predetermined events, and
the particular method has a name and a set of zero or more parameters defined in the client-side adapter library based on the particular event.

12. A method as recited in claim 9, wherein the client-side adapter library comprises object-oriented classes for events and responses.

13. A method as recited in claim 9, wherein the client-side adapter library comprises an object-oriented interface for processing each event of the plurality of predetermined events.

14. A method as recited in claim 1, wherein the database is a business vocabulary database, and further comprising the steps of:
receiving at a client site on a network, from a provider of the business vocabulary database, a client-side adapter library of methods for
translating a query for related concepts of the business vocabulary database into one or more elements of the first document, and
extracting a set of values of the related concepts from one or more elements of the second document;
developing a concept client process for the client site to generate the first query and to use a first set of values of related concepts based in part on the client-side adapter library; and
executing the concept client process to translate a particular first query into a particular first document, to send the first document to the concept server process, and to extract a particular set of values of related concepts from a particular second document including results returned from the concept server process.

15. A method as recited in claim 1, wherein the database is a business vocabulary database of concepts and relationships among concepts, the method further comprising the steps of:
generating and sending from a provider of the business vocabulary database to a client site on a network, a client-side adapter library of methods for
translating the first query for related concepts of the business vocabulary database into one or more elements of the first document, and
extracting a set of values of the related concepts from one or more elements of the second document;
developing a concept server process based on a server-side adapter library of methods for
determining a set of operations performed by a database server based on the first document, and
generating and storing a second document that aggregates results from the set of operations as one or more elements, from which second document the methods of the client-side adapter library may extract values; and
executing the concept server process to receive a particular first document from a particular concept client process, to determine a particular set of operations based on the particular first document, to cause the database server to perform the particular set of operations, to generate and store a particular second document including results based on responses from the set of operations, and to send the particular second document to the particular client process.

16. A method as recited in claim 1, wherein the steps are performed at a client side adapter based on a client side adapter library of methods.

17. A computer-readable medium carrying one or more sequences of instructions for translating any of a plurality of queries for related concepts in a database of concepts and relationships among concepts, the database local to a concept server process, a first query originating from a first concept client process, wherein a plurality of other concept client processes may issue other respective queries, which instructions, when executed by one or more processors, cause the one or more processors to carry out the steps of:

accepting the first query in a format required by the first concept client process;

translating the query into one or more concept server request data structures that are expressed using a markup language in a first document, wherein each of the request data structures represents a request for the concept server to transform the first query into a concept tree, one or more related concepts, or one or more normative terms;

sending the first document to a concept server over a network;

receiving over the network from the concept server a second document in the markup language that includes results based on the concept server process processing the request data structures, wherein the results comprise one or more concept categories, normative terms, alternative terms, or related concepts for the first query; and translating from the markup language in the second document into values of related concepts in the format required by the first concept client process.

18. An apparatus for translating any of a plurality of queries for related concepts in a database of concepts and relationships among concepts, the database local to a concept server process, a first query originating from a first concept client process, wherein a plurality of other concept client processes may issue other respective queries, comprising:

means for accepting the first query in a format required by the first concept client process;

means for translating the first query into one or more concept server data structures that are expressed using a markup language in a first document, wherein each of the request data structures represents a request for the concept server to transform the first query into a concept tree, one or more related concepts, or one or more normative terms;

means for sending the first document to the concept server process over a network;

means for receiving over the network from the concept server a second document in the markup language that includes results based on the concept server process processing the request data structures, wherein the results comprise one or more concept categories, normative terms, alternative terms, or related concepts for the first query; and means for translating from the markup language in the second document into values of related concepts in the format required by the first client process.

19. An apparatus for translating any of a plurality of queries for related concepts in a database of concepts and relationships among concepts, the database local to a concept server process, a first query originating from a first concept client process, wherein a plurality of other concept client processes may issue other respective queries, comprising:

one or more processors;

one or more sequences of instructions that are accessible to the one or more processors and which, when executed by the one or more processors, cause the one or more processors to carry out the steps of:

accepting the first query in a format required by the first concept client process;

translating the first query into a normalized format using a markup language in a first document, wherein each of the request data structures represents a request for the concept server to transform the first query into a concept tree, one or more related concepts, or one or more normative terms;

sending the first document to a concept server over the network;

receiving over the network from the concept server a second document in the markup language that includes results based on the concept server process processing the request data structures, wherein the results comprise one or more concept categories, normative terms, alternative terms, or related concepts for the first query; and translating from the markup language in the second document into values of the related concepts in the format required by the first concept client process.

* * * * *